United States Patent
Maxik et al.

(10) Patent No.: US 9,408,275 B2
(45) Date of Patent: Aug. 2, 2016

(54) SYSTEM FOR OPTIMIZING LIGHT ABSORBANCE AND ASSOCIATED METHODS

(71) Applicant: Biological Illumination, LLC, Satellite Beach, FL (US)

(72) Inventors: Fredric S. Maxik, Cocoa Beach, FL (US); Robert R. Soler, Cocoa Beach, FL (US); David E. Bartine, Cocoa, FL (US); Eliza Katar Grove, Satellite Beach, FL (US); Neil Yorio, Indian Harbour Beach, FL (US); Anthony Crawford, Palm Bay, FL (US); Gregory Flickinger, Indialantic, FL (US)

(73) Assignee: Biological Illumination, LLC, Melbourne, FL (US)

( * ) Notice: Subject to any disclaimer, the term of this patent is extended or adjusted under 35 U.S.C. 154(b) by 0 days.

(21) Appl. No.: 14/513,249

(22) Filed: Oct. 14, 2014

(65) Prior Publication Data

US 2015/0061510 A1     Mar. 5, 2015

Related U.S. Application Data

(63) Continuation-in-part of application No. 13/681,522, filed on Nov. 20, 2012, now Pat. No. 9,137,874.

(60) Provisional application No. 61/566,163, filed on Dec. 2, 2011.

(51) Int. Cl.
*H05B 37/02* (2006.01)
*H05B 33/08* (2006.01)
*A01G 7/04* (2006.01)

(52) U.S. Cl.
CPC ............ *H05B 33/0869* (2013.01); *A01G 7/045* (2013.01); *H05B 33/0863* (2013.01); *H05B 37/02* (2013.01)

(58) Field of Classification Search
CPC .................................................. H05B 37/02
USPC .................. 315/149–159, 291, 297, 307, 312
See application file for complete search history.

(56) References Cited

U.S. PATENT DOCUMENTS

| 3,869,605 A | 3/1975 | Davis |
| 3,930,335 A | 1/1976 | Widmayer |

(Continued)

FOREIGN PATENT DOCUMENTS

| DE | 202004009616 U1 | 11/2004 |
| DE | 102010004042 A1 | 7/2011 |

(Continued)

OTHER PUBLICATIONS

International Search Report and Written Opinion dated Feb. 14, 2013, cited in related application PCT/US2012/067579, filed Dec. 3, 2012 (13 pages).

(Continued)

*Primary Examiner* — Tung X Le
(74) *Attorney, Agent, or Firm* — Mark Malek; Stephen Bullock; Widerman Malek, PL

(57) ABSTRACT

A lighting system with adjustable wavelength output that may include a plurality of light sources, a controller positioned in electrical communication with the plurality of light sources, and an optical sensor system positioned in electrical communication with the controller. The controller may be configured to selectively operate each light source of the plurality of light sources to emit one or more source lights. The optical sensor system may be configured to sense a reflected light that is reflected by an object upon which the source lights are incident. The optical sensor system may be configured to sense a wavelength range of the reflected light defined as a measured wavelength range and may further be configured to transmit a signal to the controller responsive to the measured wavelength range. The controller may be configured to operate the plurality of light sources responsive to the signal received from the optical sensor system.

21 Claims, 19 Drawing Sheets

(56) References Cited

U.S. PATENT DOCUMENTS

| | | | |
|---|---|---|---|
| 3,931,695 | A | 1/1976 | Widmayer |
| 5,012,609 | A | 5/1991 | Ignatius et al. |
| 5,036,437 | A | 7/1991 | Macks |
| 5,278,432 | A | 1/1994 | Ignatius et al. |
| 5,606,821 | A | 3/1997 | Sadjadi et al. |
| 5,659,977 | A | 8/1997 | Jensen et al. |
| 6,474,838 | B2 | 11/2002 | Fang et al. |
| 6,554,450 | B2 | 4/2003 | Fang et al. |
| 6,921,182 | B2 | 7/2005 | Anderson et al. |
| 7,058,197 | B1 | 6/2006 | McGuire et al. |
| 7,086,756 | B2 | 8/2006 | Maxik |
| 7,086,767 | B2 | 8/2006 | Sidwell et al. |
| 7,138,770 | B2 | 11/2006 | Uang et al. |
| 2001/0018828 | A1 | 9/2001 | Kadotani |
| 2001/0047618 | A1 | 12/2001 | Fang et al. |
| 2002/0026659 | A1 | 2/2002 | Blowers et al. |
| 2003/0009933 | A1 | 1/2003 | Yoneda et al. |
| 2003/0156425 | A1 | 8/2003 | Turnbull et al. |
| 2004/0109302 | A1 | 6/2004 | Yoneda et al. |
| 2004/0116039 | A1* | 6/2004 | Mueller ............ A63H 27/10 446/220 |
| 2005/0281027 | A1 | 12/2005 | Capen et al. |
| 2006/0022214 | A1 | 2/2006 | Mueller et al. |
| 2006/0053691 | A1 | 3/2006 | Harwood et al. |
| 2006/0104058 | A1 | 5/2006 | Chemel et al. |
| 2006/0176686 | A1 | 8/2006 | McVicker |
| 2006/0203209 | A1 | 9/2006 | De Vaan |
| 2007/0058368 | A1 | 3/2007 | Partee et al. |
| 2007/0289207 | A1 | 12/2007 | May et al. |
| 2009/0086492 | A1 | 4/2009 | Meyer |
| 2009/0199470 | A1 | 8/2009 | Capen et al. |
| 2010/0020536 | A1 | 1/2010 | Bafetti et al. |
| 2010/0076620 | A1 | 3/2010 | Loebl et al. |
| 2010/0115830 | A1 | 5/2010 | Dube |
| 2010/0259190 | A1 | 10/2010 | Aikala |
| 2010/0287830 | A1 | 11/2010 | Chen et al. |
| 2011/0068698 | A1* | 3/2011 | Swoboda ............ F21K 9/137 315/153 |
| 2011/0209400 | A1 | 9/2011 | Rooymans |
| 2012/0229032 | A1* | 9/2012 | Van De Ven ....... H05B 33/086 315/151 |
| 2013/0002167 | A1* | 1/2013 | Van De Ven ....... H05B 33/0815 315/297 |

FOREIGN PATENT DOCUMENTS

| | | |
|---|---|---|
| EP | 1479286 A1 | 11/2004 |
| EP | 1933602 A1 | 12/2007 |
| JP | H08103167 A | 4/1996 |
| JP | 08242694 A | 9/1996 |
| JP | 2000-068555 A | 3/2000 |
| JP | 3070828 U | 5/2000 |
| JP | 2002-253201 A | 9/2002 |
| WO | WO 03/055273 A2 | 7/2003 |
| WO | WO 2005-089477 A2 | 9/2005 |
| WO | WO 2005/109532 A1 | 11/2005 |
| WO | WO 2008002073 A1 | 1/2008 |
| WO | WO 2009/022016 A1 | 2/2009 |
| WO | WO 2010014010 A2 | 2/2010 |
| WO | WO 2013008288 A1 | 6/2013 |

OTHER PUBLICATIONS

International Search Report dated May 11, 2008, cited in related application PCT/EP2008/060776, filed Dec. 3, 2012 (13 pages).

European Searh Report dated Jan. 16, 2008, cited in related application EP 07114397.8, filed Aug. 15, 2007 (3 pages).

Stutte, et al., "Photoregulation of Bioprotectant Content of Red Leaf Lettuce with Light-emitting Diodes", HortScience, vol. 44(1), pp. 79-82, Feb. 2009.

Stutte, Gary, "Light-emitting Diodes for Manipulating the Phytochrome Apparatus", HortScience, vol. 44(2), pp. 231-234, Apr. 2009.

Non-Final Office Action dated Jun. 16, 2013, cited in related U.S. Appl. No. 13/681,522, filed Nov. 20, 2012 (21 pages).

Applicant-Initiated Interview Summary Office Action dated Jan. 28, 2014, cited in related U.S. Appl. No. 13/681,522, filed Nov. 20, 2012 (5 pages).

Final Office Action dated Mar. 12, 2014, cited in related U.S. Appl. No. 13/681,522, filed Nov. 20, 2012 (20 pages).

Advisory Office Action dated Jun. 17, 2013, cited in related U.S. Appl. No. 13/681,522, filed Nov. 20, 2012 (6 pages).

Non-Final Office Action dated Nov. 20, 2014 cited in related U.S. Appl. No. 13/681,522, filed Nov. 20, 2012 (41 pages).

* cited by examiner

| Input Wattage | 65 | 45 | 50 |
|---|---|---|---|
| PAR [μmol] | 92.71 | 66.25 | 70.51 |
| YPF [μmol] | 72.05 | 49.72 | 61.20 |
| YPF/W [μmol/W] | 1.1 | 1.1 | 1.2 |
| Color Temp. (CCT) | 1,509 | 3,050 | 3,826 |
| CRI | -181 | 69 | 74 |

FIG. 7

SYSTEM FOR OPTIMIZING LIGHT ABSORBANCE AND ASSOCIATED METHODS

RELATED APPLICATIONS

This application is a continuation-in-part and claims the benefit under 35 U.S.C. §120 of U.S. patent application Ser. No. 13/681,522 entitled Illumination and Grow Light System and Associated Methods filed Nov. 20, 2012, which in turn claims the benefit of U.S. Provisional Patent Application Ser. No. 61/566,163 entitled Plant Grow Light filed Dec. 2, 2011, the entire contents of each of which are incorporated herein by reference, except to the extent disclosure therein is inconsistent with disclosure herein.

In addition, the contents of each of U.S. patent application Ser. No. 12/673,522 entitled "LED Lighting Device for Growing Plants" filed Aug. 15, 2008, and U.S. patent application Ser. No. 10/468,155 entitled "Method of Cultivating Plants" filed Jan. 9, 2004, are incorporated herein by reference in their entirety, except to the extent disclosure therein is inconsistent with disclosure herein.

FIELD OF THE INVENTION

The present invention relates to systems and methods for optimizing light absorbance and, more specifically to systems and methods which detect reflected light and adjust light output characteristics based on the detected reflected light.

BACKGROUND

Promotion of plant growth using artificial light to augment or replace solar light has been the focus of significant research and experimentation. However, because each plant pigment absorbs light at one or more specific wavelength ranges, and the areas of peak absorption for each pigment are narrow, selecting and generating light wavelengths that produce superior plant growth remains a design challenge in grow light technology.

The absorption spectra of many plants containing chlorophyll exhibit peak absorption in the wavelength ranges of about 410-490 nanometers ("blue light") and of about 590-650 nanometers ("red light"). Comparatively little light in the wavelength range of 500-570 nanometers ("green light") is absorbed by the chlorophyll, which is consistent with the green appearance of plants. Consequently, conventional plant grow lights are designed to illuminate plants with peaks in both the blue light and red light regions corresponding generally to the plant absorption spectrum. Light in the wavelength range roughly centered on green light is often absent or near absent from the emissions of traditional grow lights. Of note is that the absorption spectra of most plants are also within the photopic spectral sensitivity for human vision, or "visible light," generally defined as light having a wavelength in the range of about 400 to 700 nanometers (nm).

Lighting technologies such as incandescent, fluorescent, metal halide, and high-pressure sodium lamps have been employed in grow lights, with varying degrees of success. However, these conventional light sources suffer from various degrees of poor electrical efficiency (ranging from 10% to 40% of electrical energy consumed being converted to optical energy emitted within the visible spectral region) and low operation lifetimes (ranging from 1,000 hours to 24,000 hours of performance). Furthermore, these conventional light sources cannot control the spectral quality of emissions without the inefficient and limited utilization of additional filters. Moreover, these technologies' control of the radiation quantity is also limited, reducing the possibility of versatile lighting regimes such as pulsed operation. Also, the red-blue light of conventional plant grow lights is unattractive to humans as it appears purple and does not reveal the true or near true color of the plants that it illuminates.

Use of light-emitting diodes (LEDs) and related solid-state lighting (SSL) as potentially viable alternative lighting technologies for grow lights is gaining attention in the art. The best AlInGaP red and AlInGaN green and blue HB-LEDs can have internal quantum efficiencies better than 50%. Moreover, LED-based light sources support full controllability of both the direction and intensity of the emitted radiation, making it possible to avoid most of the losses associated with traditional grow lights. Additionally, the narrow spectral bandwidth characteristic of colored LEDs allows selection of the peak wavelength emission that most closely matches the absorption peak of a selected plant pigment. Furthermore, because LED lighting is much cooler than conventional plant lighting sources, an LED-based plant light may be placed much closer to a plant than a conventional plant light, with a resulting increase in light intensity falling on the leaves of a plant.

U.S. Pat. Nos. 5,278,432 and 5,012,609, both issued to Ignatius et al., disclose using an array of LEDs to provide radiant energy to plants broadly within bands 620 to 680 nm or 700 to 760 nm (red), and also 400 to 500 nm (blue). U.S. Pat. No. 6,921,182 to Anderson et al. discloses a proportion of twelve red LEDs (660 nm), plus six orange LEDs (612 nm) and one blue LED (470 nm). U.S. Patent Publication No. 2010/0259190 by Aikala discloses a single light emission source LED device capable of generating emission peaks that match well with a plant photosynthesis response spectrum. All of the implementations above attempt to provide an optimal mix of wavelengths to enhance plant growth, as well as low power consumption and long operation lifetime when compared to the existing grow light technologies. However, none of these implementations automatically adjust their emission spectra to match the specific energy absorption demands of different plants nor the evolving absorption demands of over time of a single plant. Furthermore, none of these implementations address the fact that the mix of wavelengths chosen to enhance plant growth are also unattractive to humans viewing the illuminated plant.

U.S. Patent Publication No. 2009/0199470 by Capen et al. discloses a lamp for growing plants that includes a set of red LEDs with a peak wavelength emission of about 660 nm, a set of orange LEDs with a peak wavelength emission of about 612 nm, and a set of blue LEDs with a peak wavelength emission of about 465 nm. The lamp also includes a green LED that has a wavelength emission between 500 and 600 nm, the purpose of which is to provide a human observer with an indication of general plant health. However, the disclosed implementation suffers from similar deficiencies as the references discussed above as it does not automatically adjust its emission spectra to match the specific energy absorption demands of different plants nor the evolving absorption demands of over time of a single plant. Furthermore, the course addition of green light to its mix of wavelengths falls short of revealing the true or near true color of the plants that it illuminates Photosynthesis is a process by which chlorophyll molecules in plants absorb light energy and use that energy to synthesize carbohydrates from carbon dioxide ($CO_2$) and water. Referring now to FIG. 1, the absorption spectrum 100 of a green plant is illustrated for the two main types of chlorophyll, named chlorophyll a and chlorophyll b. The slight difference in the composition of a sidechain in the two types of chlorophyll causes the absorption spectrum of chlorophyll a 110 to differ from the absorption spectrum of chlorophyll b 120. Consequently, the two kinds of chlorophyll complement each other in absorbing light energy, such that light of a wavelength that is not significantly absorbed by chlorophyll a may instead be captured by chlorophyll b, which may absorb strongly at that wavelength.

Continuing to refer to FIG. 1, the absorption maxima of chlorophyll a are at 430 nm and at 662 nm. The absorption maxima of chlorophyll b are at 453 nm and 642 nm. Little or no absorption of "green light" with wavelengths in the 500 to 600 nm range is present in the absorption spectra of either chlorophyll a or chlorophyll b 110, 120.

Referring now to FIG. 2, the emissions spectrum of a traditional grow light 200 features peaks in both the red light 210 and blue light 220 regions. As illustrated, the red light peak 210 is about 625 nm and the blue light peak 220 is about 450 nm. Such a configuration attempts to coarsely match the absorption spectrum of plants containing chlorophyll 100.

Referring now to FIG. 3, an action spectrum 300 is a plot of biological effectiveness as a function of the wavelength of incident light. The abscissa is wavelength in nanometers (nm) and the ordinate is the relative action normalized to 1. As indicated from the action spectrum 300, plants respond to the broad range of optical light but are most responsive in the 580 to 680 nm range (generally red light). Additionally, many varieties of plant species require a significant amount of light energy with a wavelength less than 500 nm (generally blue light) for healthy or optimum growth.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a lighting system with adjustable wavelength output that may comprise a plurality of light sources, a controller positioned in electrical communication with the plurality of light sources, and an optical sensor system positioned in electrical communication with the controller. The controller may be configured to selectively operate each light source of the plurality of light sources to emit one or more source lights. The optical sensor system may be configured to sense a reflected light that is reflected by an object upon which the source lights are incident. The optical sensor system may be configured to sense a wavelength range of the reflected light defined as a measured wavelength range and may further be configured to transmit a signal to the controller responsive to the measured wavelength range. The controller may be configured to operate the plurality of light sources responsive to the signal received from the optical sensor system.

Another exemplary aspect of the invention includes a lighting system with adjustable wavelength output, the lighting system including a plurality of light emitting diodes (LEDs), a controller positioned in electrical communication with the plurality of LEDs and configured to selectively operate each LED of the plurality of LEDs to emit one or more source lights, and an optical sensor system positioned in electrical communication with the controller, an optic configured to combine the one or more source lights to be defined as a combined light. The optical sensor system is configured to sense a reflected light that is reflected by an object upon which the source lights are incident. The optical sensor system is configured to sense a wavelength range of the reflected light defined as a measured wavelength range. The optical sensor system is configured to transmit a signal to the controller responsive to the measured wavelength range. The controller is configured to operate the plurality of LEDs responsive to the signal received from the optical sensor system. The reflected light sensed by the optical sensor system is associated with the one or more source lights. The controller is configured to reduce emission of the one or more source lights associated with the reflected light sensed by the optical sensor system. At least one LED of the plurality of LEDs is configured to selectively operate between a sensing operation and an emitting operation, the sensing operation being defined by the at least one LED being configured to operate as the optical sensor system, and the emitting operation being defined by the at least one LED being configured to operate as a light source of the plurality of LEDs. The one or more source lights each comprise a source light wavelength range. The controller is configured to identify a measured wavelength range that does not correspond to the source light wavelength range of the one or more source lights. The controller is configured to associate the measured wavelength range with at least one LED of the plurality of LEDs. The controller is configured to operate the plurality of LEDs responsive to an indication of a reflected light comprising a wavelength range not associated with the wavelength range of the one or more source lights.

Some embodiments of the invention may include any single or combinational of an optic configured to combine the one or more source lights to be defined as a combined light, where the reflected light sensed by the optical sensor system is associated with the one or more source lights; and wherein the controller is configured to reduce emission of the one or more source lights associated with the reflected light sensed by the optical sensor system, where the measured wavelength range comprises at least one of 410 nm to 490 nm, and 590 nm to 650 nm, where the optical sensor system comprises an optical divider and an optical sensor; wherein the optical divider is configured to divide the reflected light into a plurality of monochromatic wavelength ranges; and wherein the optical sensor is configured to receive the plurality of monochromatic wavelength ranges, where the optical sensor system comprises a plurality of monochromatic filters and an optical sensor; wherein the optical sensor system is configured to cycle through the plurality of monochromatic filters; wherein each of the monochromatic filters is configured to receive the reflected light and permit light within a wavelength range to pass therethrough, defined as a filtered light; and wherein the optical sensor is configured to receive the filtered light from each of the monochromatic filters, where the optical sensor system includes at least one of a charge-coupled device (CCD) color sensor, a photomultiplier tube, a photodiode, and an avalanche photodiode (APD), where the plurality of light sources comprises a plurality of light emitting diodes (LEDs); and wherein at least one LED of the plurality of LEDs is configured to selectively operate between a sensing operation and an emitting operation, the sensing operation being defined by the at least one LED being configured to operate as the optical sensor system, and the emitting operation being defined by the at least one LED being configured to operate as a light source of the plurality of light sources. Where the source light emitted by each light source of the plurality of light sources comprises a power intensity; and wherein the controller is further configured to selectively operate each light source of the plurality of light sources to emit a source light having differing power intensities, where the optical sensor system is configured to determine a baseline reflectance; and wherein the controller is configured to selectively operate the plurality of light sources responsive to deviations of the reflected light that is sensed by the optical sensor system from the baseline reflectance, where at least one of the optic and a light source of plurality of light sources comprises a color conversion layer; wherein the color conversion layer is configured to receive a source light within a source light wavelength range and emit a converted light within a converted light wavelength range, where the one or more source lights each comprise a source light wavelength range; wherein the controller is configured to identify a measured wavelength range that does not correspond to the source light wavelength range of the one or more source lights; wherein the controller is configured to associate the measured wavelength range with at least one light source of the plurality of light sources; and wherein the controller is configured to operate the plurality of light sources responsive to an indication of a reflected light comprising a wavelength range not associated with the wavelength range of the one or more source lights. Where the controller is configured to identify a source light of the one or more source lights that has undergone a wavelength conversion to a wavelength range defined as a converted wavelength range based on the light reflected from the object upon which the source light of the one or more source lights was incident defined as a converted reflected light; and wherein the controller is configured to associate the light source that emits the source light resulting in the reflected light comprising the converted wavelength range with the converted reflected light.

Another exemplary aspect of the invention includes a method of operating a lighting system having a plurality of light sources, a controller in electrical communication with the plurality of light sources, and an optical sensor in electrical communication with the controller. The method includes selectively operating each light of the plurality of light sources to emit a source light, sensing a reflected light that is reflected by an object upon which the source light is incident, sensing a wavelength range of the reflected light defined as a measured wavelength range, transmitting a signal to the controller responsive to the measured wavelength range, and operating the plurality of light sources responsive to the signal received from the optical sensor system.

BRIEF DESCRIPTION OF THE DRAWINGS

FIG. 7 is a table illustrating a comparison of emission parameters of the exemplary grow light of FIG. 2, the invention embodiment of FIG. 5, and the invention embodiment of FIG. 6.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention text, as shown and described by the various figures and accompanying text, provides a lighting system which adjusts the spectral output based on the detected environmental light. In particular, the light system may adjust its spectral output based on the detected light reflecting from a plant and/or canopy.

Some of the illustrative aspects of the present invention may be advantageous in solving the problems herein described and other problems not discussed which are discoverable by a skilled artisan.

Figure 1:
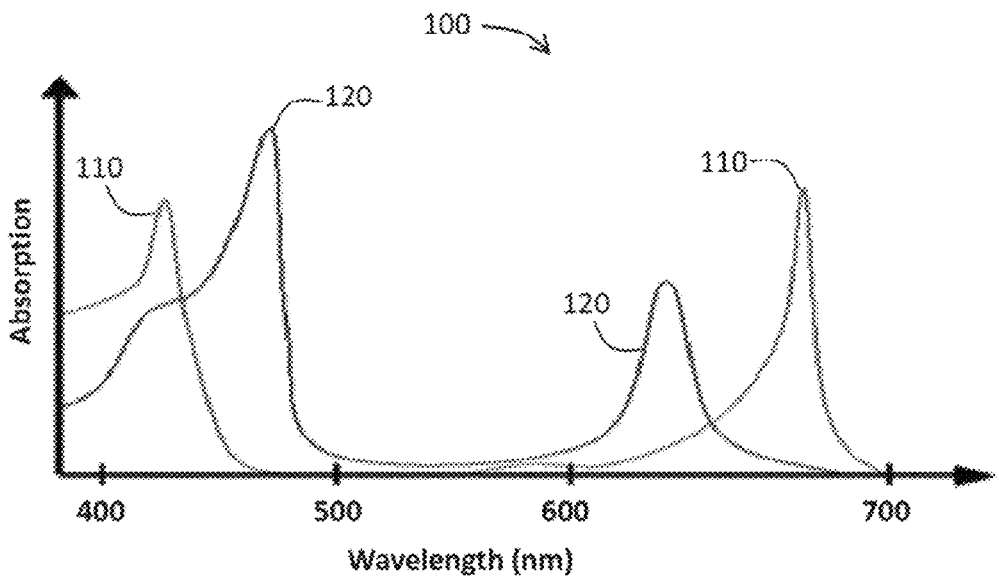
FIG. 1 is a graph illustrating an absorption spectrum of an exemplary plant containing chlorophyll.
Figure 2:
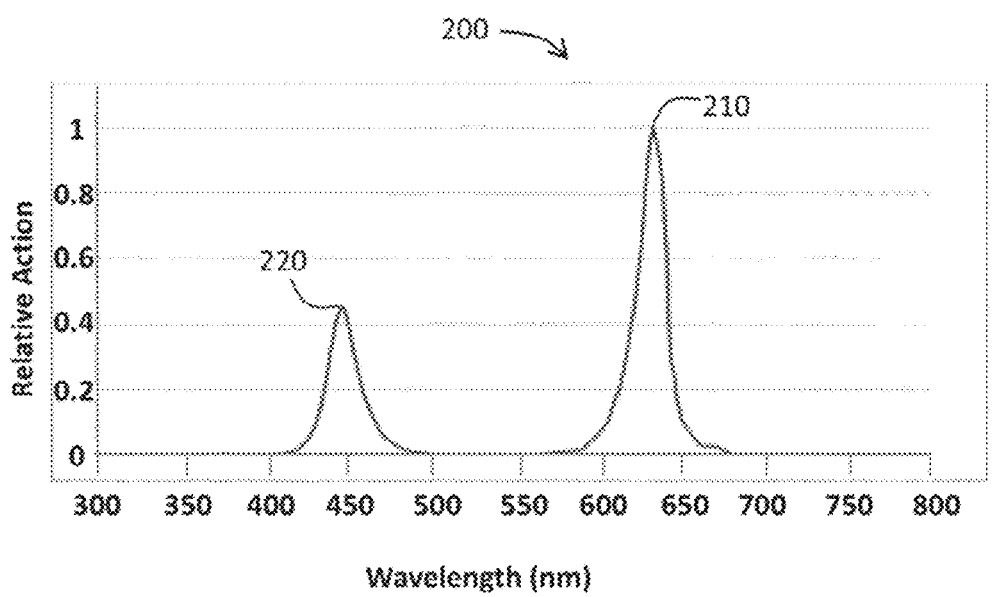
FIG. 2 is a graph illustrating an emissions spectrum of an exemplary grow light known in the art.
Figure 3:
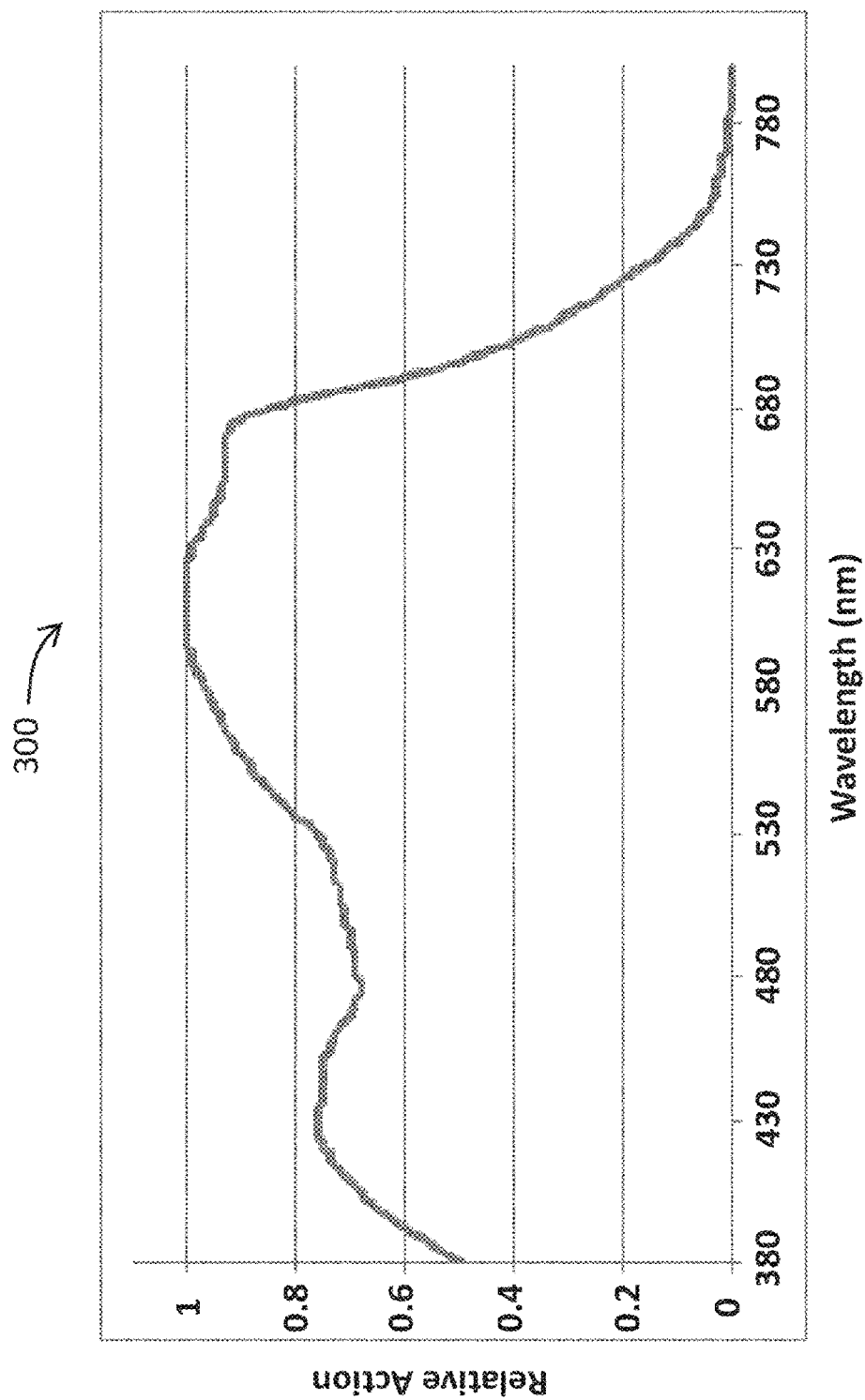
FIG. 3 is a graph illustrating a normalized photosynthetic response action spectrum for the exemplary plant of FIG. 1.
Figure 4:
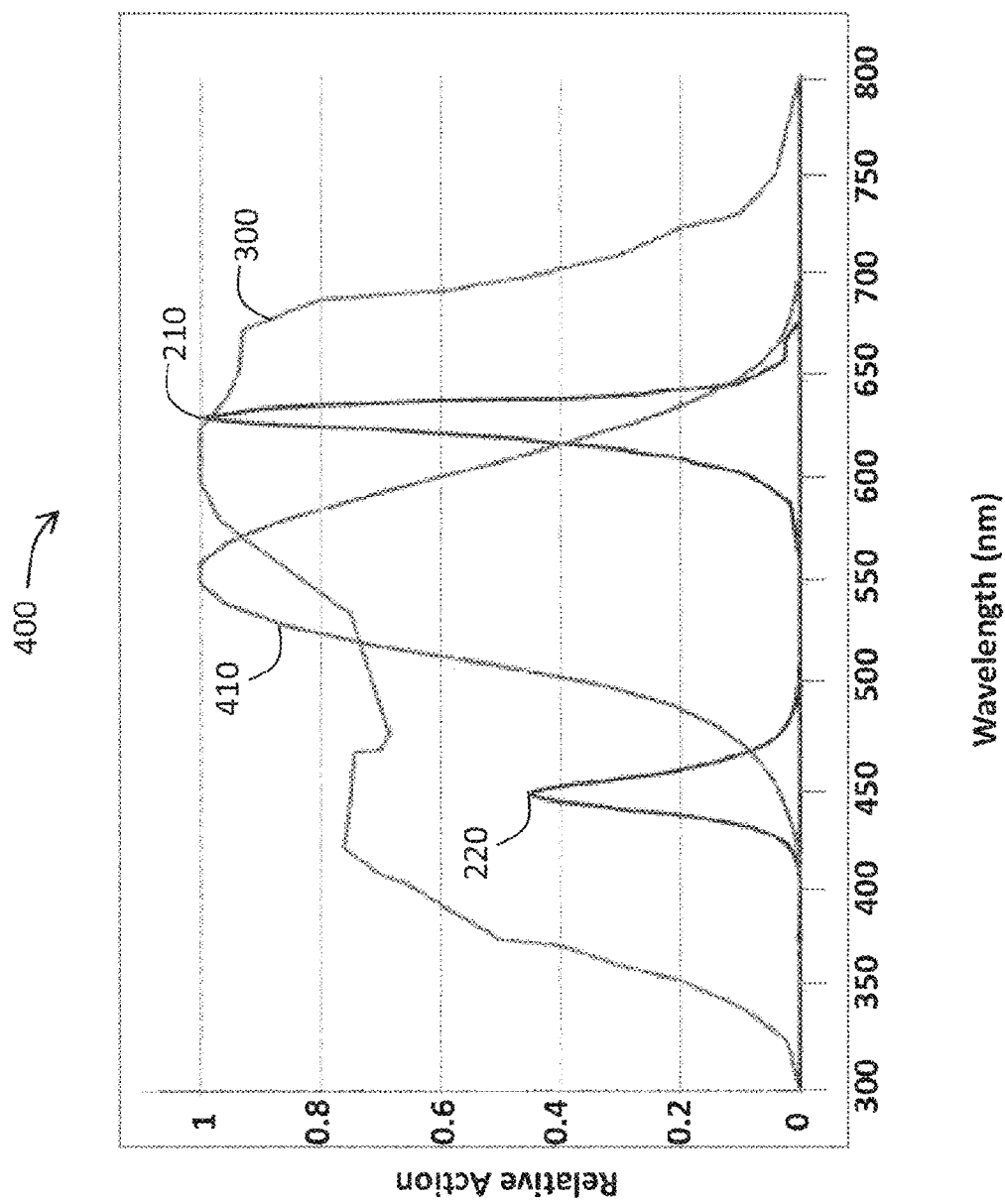
FIG. 4 is a graph illustrating a human photopic response spectrum overlayed with the exemplary photosynthetic response action spectrum of FIG. 3 and with the exemplary grow light emissions spectrum of FIG. 2.

Referring now to FIG. 4, the graph illustrates an overlay of the emissions spectrum of a conventional grow light 200, the normalized plant photosynthetic response action spectrum 300, and the human photopic response 410. The human photopic response is essentially the action spectrum of the human visual system. Per the illustration, conventional grow lights that employ simple configurations of blue and red lights do not provide light energy optimized to the absorption capability of plants 300. Furthermore, because of the absence or near absence of light in the 500 to 560 nm range (green light), the color of light generated by traditional grow light solutions 210, 220 has a purple hue, which is unpleasant to humans as it does not reveal the true color or near true color of the plant that it illuminates.

Embodiments of the present invention may provide both increased efficiency in supplying plants with energy while providing attractive (color temperature) and realistic (color rendering) appearance to humans. The figures and accompanying description below shows overlays of the new grow light spectrum with the plant action spectrum and the human photopic response according to two example embodiments of the invention. Neither of the example embodiments nor specific features of their implementations should be considered limiting to the scope of the invention.

The following parameters are relevant to photosynthetic efficiency in grow light technology:

Photosynthetically Activated Radiation (PAR)—radiation between 400 and 700 nm (how much light energy is available to plants)

Photosynthetic Photon Flux (PPF)—number of photons per second onto one square meter Yield Photon Flux (YPF)—weighted measure of photons per second (how effectively the PPF is used by plants); Note: Because red light (or red photons) is used by a grow light more effectively to induce photosynthetic reaction, YPF PAR gives more weight to red photons based on the plant sensitivity curve.

Figure 5:
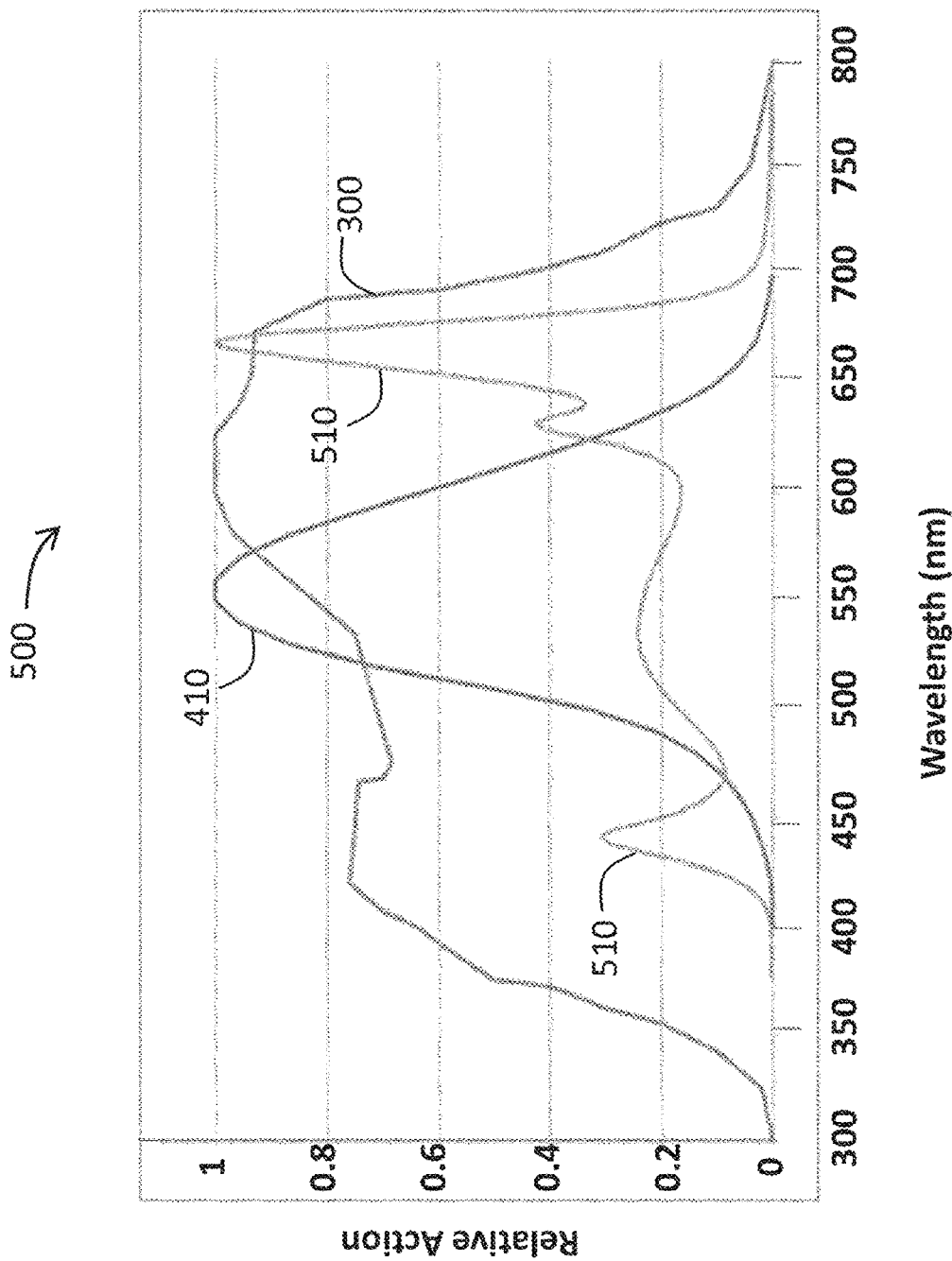
FIG. 5 is a graph illustrating an emissions spectrum of an illumination and grow light system according to an embodiment of the present invention.

Referring now to FIG. 5, one embodiment of the present invention targeted to plants that need a significant amount of blue light is discussed in more detail. For example, and without limitation, a light source may be configured to emit a spectrum 510 as shown. This embodiment may be designed to produce an emission spectrum which not only may match well with the plant response curve 300, but also may provide high quality light with respect to the human (photopic) response curve 410.

More specifically, as illustrated in the emitted spectrum 510, the intense peak in the far red (650 to 700 nm range) may overlap well with the plant response curve 300 while at the same time not overlapping with the human photopic response curve as significantly as do the emissions of conventional grow lights (see FIG. 4). The generated emission spectrum 510 may have a sufficient amount of visible light roughly in the green light region to provide light with good color rendering properties and an attractive appearance to humans (specifically, plants appear green, which is their true color under this light). The red light present in the generated light 510 may be very effective at stimulating plant response and may also be energy efficient. The spectrum 510 also may include blue light to ensure that plants may receive adequate blue light necessary for growth.

Figure 6:
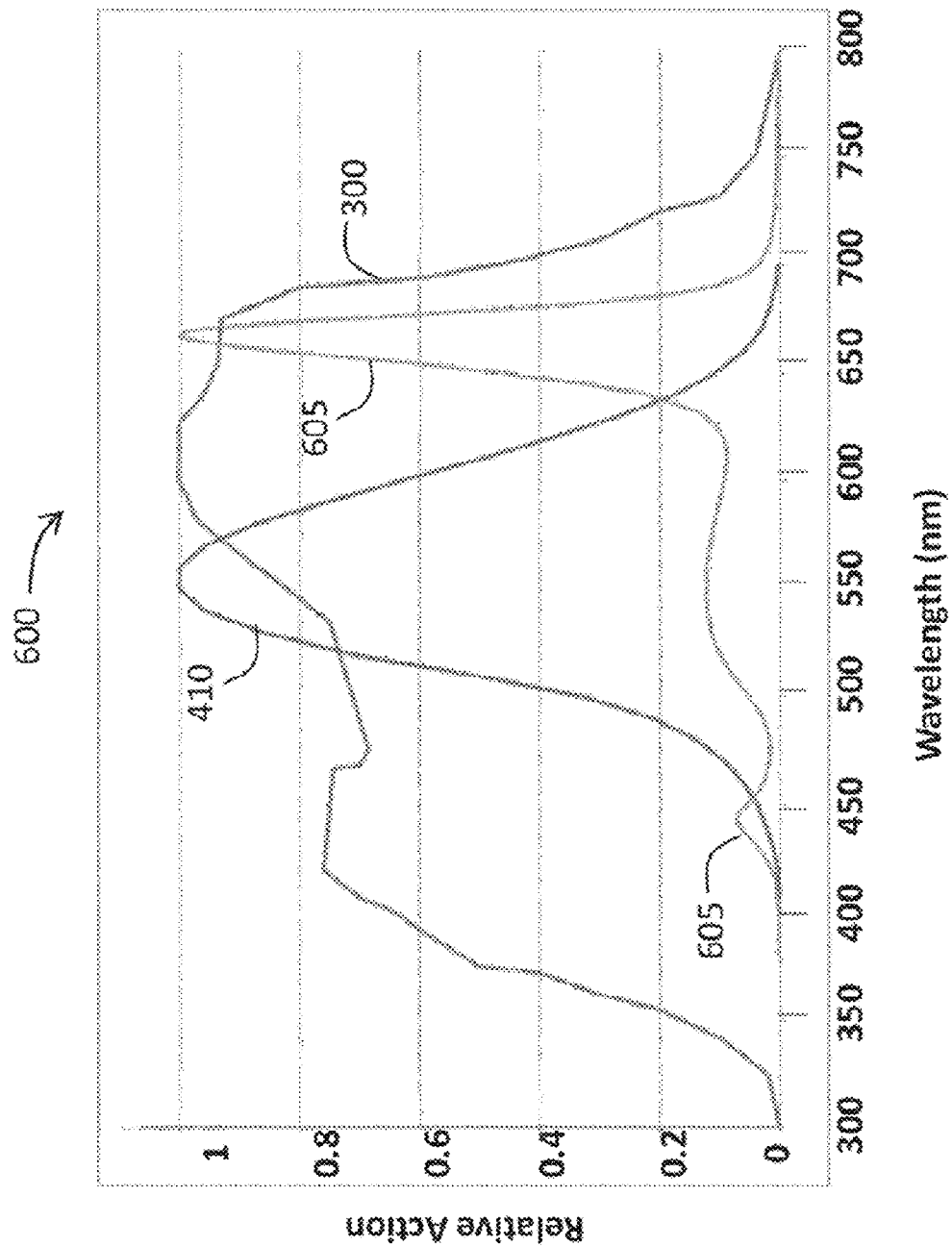
FIG. 6 is a graph illustrating an emissions spectrum of an illumination and grow light system according to an embodiment of the present invention.

Referring now to FIG. 6, another embodiment of the present invention targeted to plants that do not require as much blue light is discussed in more detail. For example, and without limitation, a light source may be configured to generate an emitted spectrum 605 as shown. This embodiment may be designed to produce an emission spectrum 605 that features significantly less blue light, which may be more advantageous for some species of plants (for example, *algae*). The emission spectrum 605 may not only match well with the plant response curve 300, but also may provide high quality light with respect to the human (photopic) response curve 410. More specifically, the presence of green light enhances the color rendering properties of the generated light 605, which may produce attractive light quality for humans (shows plants in a realistic manner). Additionally, the far red light used in this embodiment may be less susceptible to thermal variations and attenuation.

More specifically, as illustrated in the emitted spectrum 605, the red peak may overlap the plant photo action spectrum 300 (very effective light for plant growth), but may not significantly overlap the photopic response 410 causing a reddish appearance. The generated emission spectrum 605 may have a sufficient amount of green light to yield a desired color temperature and good CRI.

Both embodiments 500, 600 may yield good color rendering and good color temperatures, making them acceptable and attractive to humans. Referring now to the table 700 at FIG. 7, the relevant parameters are compared for a conventional grow light 710, for the embodiment featuring less blue light 720, and for the embodiment featuring more blue light 730. The two example embodiments of the present invention have good color temperatures and comparatively high CRIs (good for human vision) compared to the conventional lamp, while providing the highest yield of photon flux per watt (YPF/W), which is a measure of how efficiently the lamp can convert energy into plant-usable photons. More specifically, in both examples the YPF exceeds that of the conventional grow light. Moreover, the color temperature of both embodiments is above 3000 Kelvin while the conventional grow light is near 1500 Kelvin, and the CRI of both embodiments is greater than 65 while the conventional grow light CRI is negative. This result demonstrates that the grow light designs of the present invention may be superior to the conventional grow light in at least the following areas of performance: 1) uses less energy, 2) produces more Yield Photon Flux (YPF), and 3) yields a much higher CRI and attractive color temperature.

The embodiments described above are for example, and without limitation. Other spectra and optical designs could be used to accomplish one aspect of an embodiment of the invention, namely providing efficient and highly effective light for plant growth while providing a light of good visual quality and comparatively high color rendering indices (CRI). Specifically, other spectral intensity distributions can be generated along with corresponding desired color temperatures and/or color rendering indices according to the application at hand.

Figure 8:
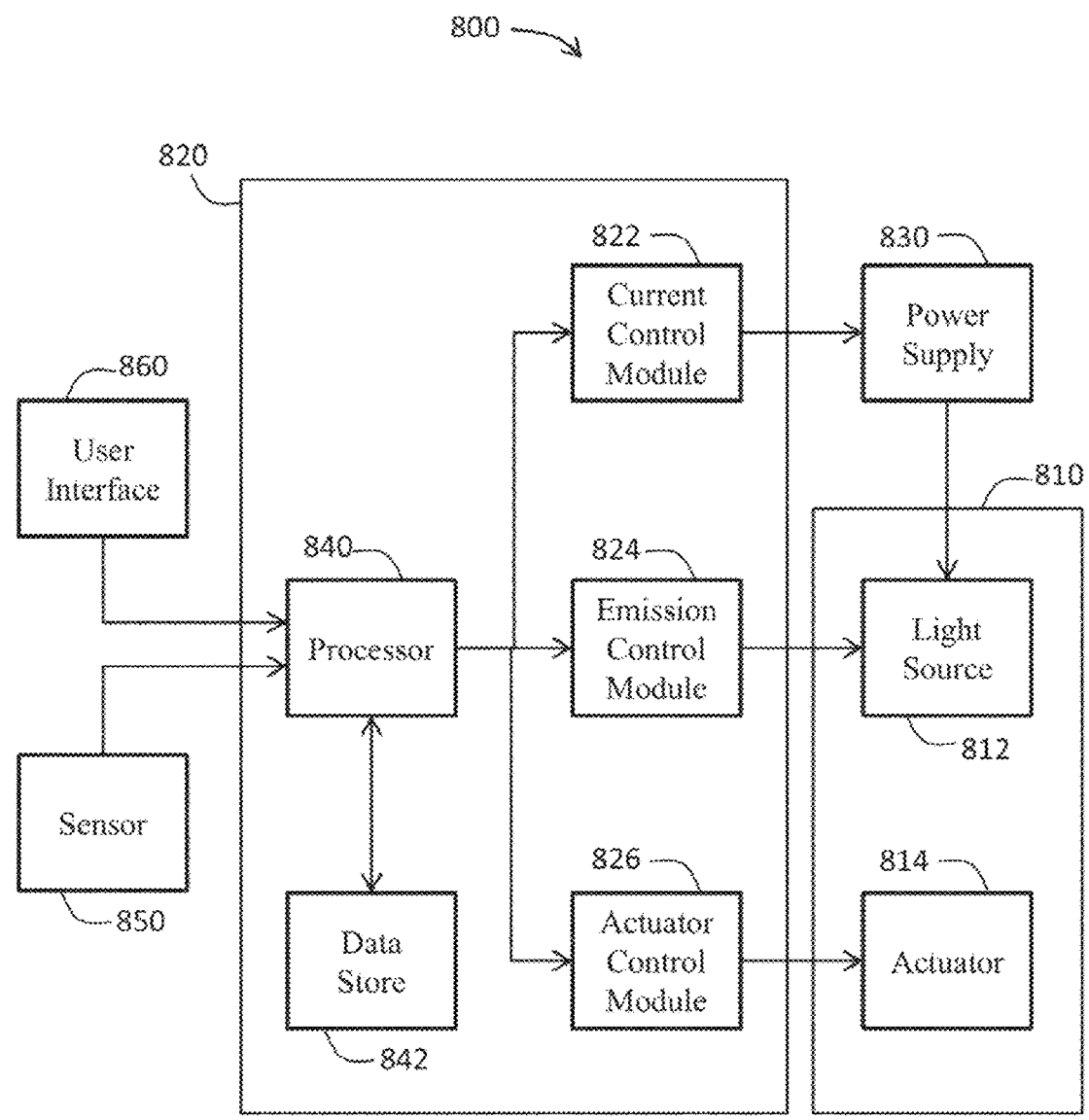
FIG. 8 is a block diagram illustrating an illumination and grow light system according to an embodiment of the present invention.

Referring now to FIG. 8, the logical components 800 of an illumination and grow light system according to an embodiment of the present invention will now be described in greater detail. For example, and without limitation, the logical components 800 of a system according to an embodiment of the present invention may comprise a lighting unit 810, a controller 820, a power supply 830, a sensor 850, and user interface 860 that may be arranged to produce a combined light that may exhibit a desired emission spectrum. The controller 820 may be designed to control the characteristics of the light emitted by the lighting unit 810. The power supply 830 may provide electric current to the lighting unit 810. The lighting unit 810 may comprise a light source 812 arranged to generate light, and also may include some number of actuators 814 designed to manipulate some characteristic of the generated light. For example, and without limitation, the actuators 814 may be electrical, mechanical or otherwise, and may operate to alter the direction and/or intensity of the generated light.

Continuing to refer to FIG. 8, the controller 820 may comprise a current control module 822 that may control the electric current provided to the lighting unit 810 by the power supply 830. The controller 820 may also comprise an emission control module 824 that may control the emission characteristics of light generated by individual light sources 812. The controller 820 may also comprise an actuator control module 826 that may control the physical manipulation of individual light sources 812 and/or of the entire lighting unit 810 by available actuators 814 in some embodiments. The current control, emission control, and actuator control modules 822, 824, 826 may be implemented as program instructions executed by a processor 840 as recorded in a data store 842.

The controller 820 may be configured to process input from some number of sensors 850, and to signal or otherwise control to obtain a desired spectral output from the lighting unit 810. A sensor 850 may be configured to sense (or monitor) ambient conditions incident to a horticultural growth and to transmit information to the controller 820. For example, and without limitation, a sensor 850 may be a simple timer or, alternatively, an environment sensor such as a fluorometer, a spectrometer, or infrared sensor. The controller 820 may respond to the signal from a sensor 850 by using one or more of the current control, emission control, and/or actuator control modules 822, 824, 826 to direct the tuning of the emission properties the lighting unit 810 such as light spectrum, shape, and flux. For example, and without limitation, the controller 820 may comprise a library of predefined types of horticultural growth. From a signal transmitted by the sensor 850, the controller 820 may derive the type of horticultural growth and the controller 820 then may choose, based on predetermined relations programmed as instructions saved in the data store 842 of the controller 820, an emission spectrum and may provide the corresponding control signal to the lighting unit 810. Hence, the present invention may allow tailoring of the emission spectrum to the type of horticultural growth.

Continuing to refer to FIG. 8, the present invention may include a user interface 860 that may be in communication with the processor 840 to transmit signals to the controller 820. The controller 820 may respond to the signals received from a user interface 860 by using one or more of the current control, emission control, and/or actuator control modules 822, 824, 826 to direct the tuning of the emission properties the lighting unit 810 such as light spectrum, shape, and flux as described above. For example, and without limitation, the tuning of the lamp using a user interface 860 may be manual (e.g., conventional dials and switches) or automated.

The controller 820 may, for example, employ one or more of the current control, emission control, and/or actuator control modules 822, 824, 826 to control the emissions of the lighting unit 810 in a way that may optimize the emission spectrum for the subject plant and may substantially minimize wasted lighting. Furthermore, the controller 820 may be configured to respond to input signals from sensors 850 and/or user interfaces 860 to control the spectrum, shape, and flux of light emitted from the lighting unit 810 to satisfy varying light demands of a single plant with respect to time and/or metabolic processes. Spectral tuning may be done automatically based on a time, a computer algorithm, or based on real or near real-time feedback from the environment and/or the plant. For example, and without limitation, a programmable timer circuit 850 may be included and the time synchronized to the environment (e.g., time of day, time of year, light cycle, etc.), and/or the photoperiod of a plant or other desired time frame. Timing may vary across species (e.g., growth cycle, growth stage, etc.).

Figure 9:
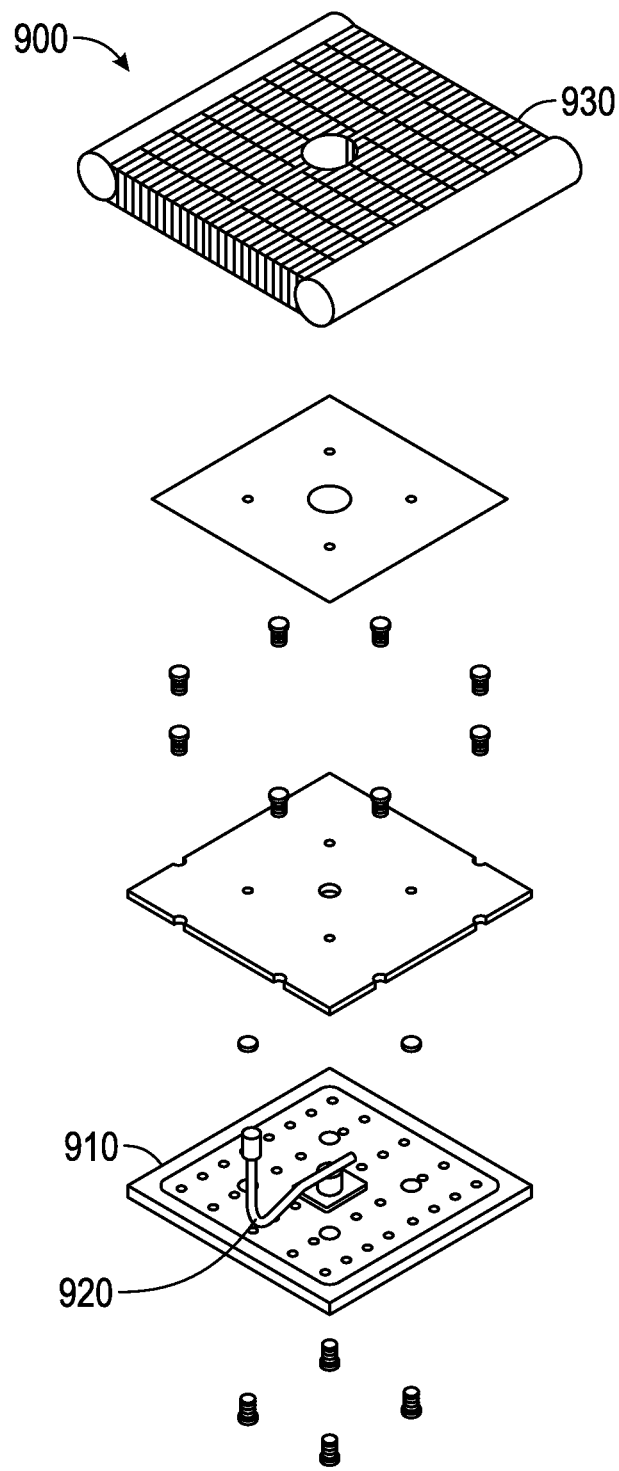
FIG. 9 is an exploded perspective view of a lamp used in connection with an illumination and grow light system according to an embodiment of the present invention.
Figure 10:
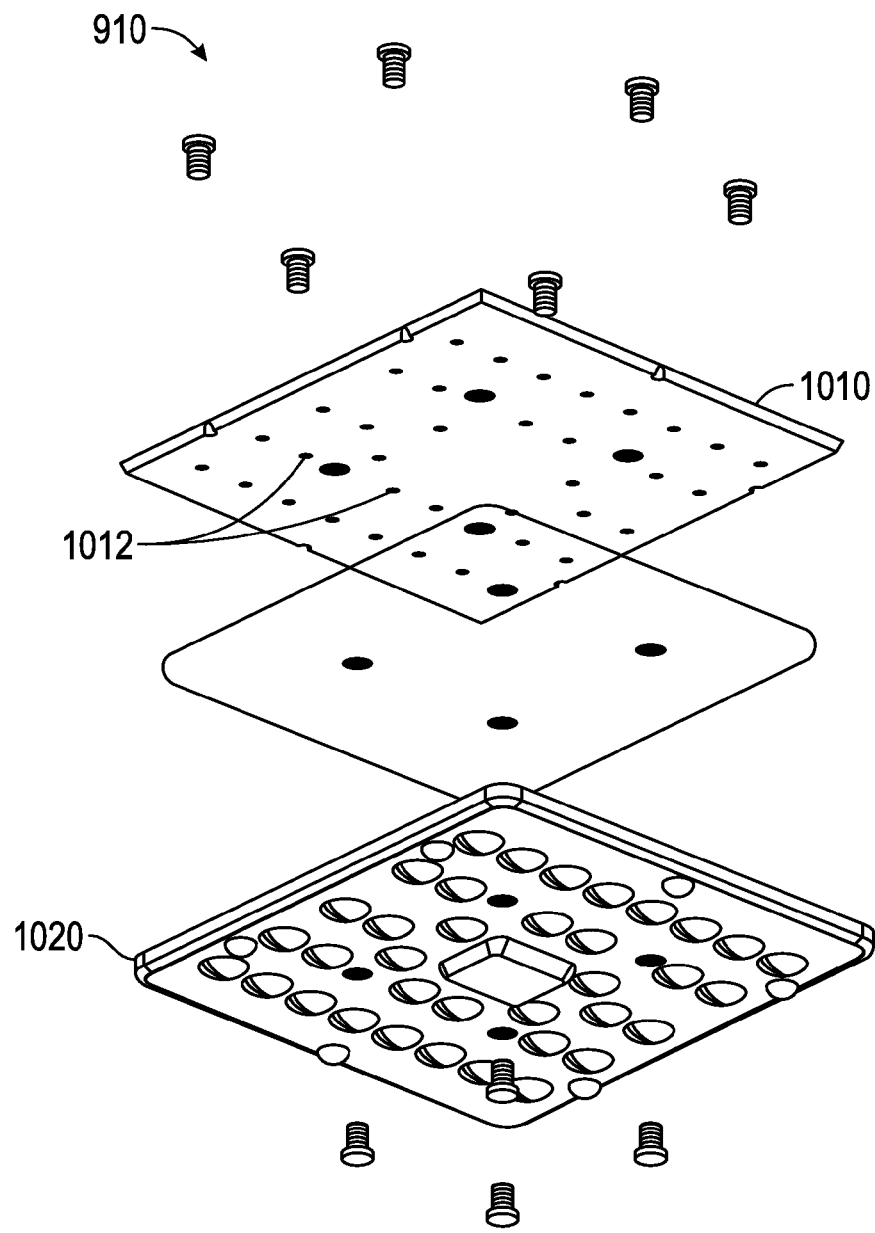
FIG. 10 is an exploded perspective of a light source of the lamp illustrated in FIG. 9.

Referring now to FIGS. 9 and 10, the physical components of a LED lamp 900 designed to operate in accordance with some embodiments presented herein will be discussed in greater detail. For example, and without limitation, the LED lamp 900 may employ a light emitting diode (LED) package 910. The LED package 910 may comprise a circuit board 1010 with LED chips 1012 that may be adhered thereto and may be configured to interface 920 with a power supply to power the circuit board 1010 and to drive the LEDs 1012.

As known in the art, the durability of an LED chip may be affected by temperature. Continuing to refer to FIG. 9, a heat sink 930 and structures equivalent thereto may serve as means for dissipating heat from the LEDs within a LED lamp 900. In one embodiment, a heat sink 930 may include fins to increase the surface area of the heat sink. Alternatively, heat sink 930 may be formed of any configuration, size, or shape, with the general intention of drawing heat away from the LEDs within the LED package 910. A heat sink 930 may be formed of a thermally conductive material such as aluminum, copper, or steel, but may be of any material that effects heat transfer. Moreover, other embodiments of heat sinks 930, including active sinks, are contemplated by the invention.

Continuing to refer to FIG. 10, an optic 1020 may be provided to surround the LED chips 1012 within the LED package 910. As used herein, the terms "surround" or "surrounding" may mean partially or fully encapsulating. For example, and without limitation, an optic 1020 may surround the LED chips 1012 by partially or fully covering one or more LEDs 1012 such that light produced by one or more LEDs 1012 may be transmitted through the optic 1020. Optic 1020 may be formed of alternative forms, shapes, or sizes. In one embodiment, optic 1020 may serve as an optic diffusing element by incorporating diffusing technology, such as described in U.S. Pat. No. 7,319,293 (which is incorporated herein by reference in its entirety). In such an embodiment, optic 1020 and structures equivalent thereto serve as a means for defusing light from the LED chips 1012. In alternative embodiments, optic 1020 may be formed of a light diffusive plastic, may include a light diffusive coating, or may having diffusive particles attached or embedded therein.

In one embodiment, optic 1020 includes a color filter applied thereto. The color filter may be on the interior or exterior surface of optic. The color filter is used to modify the light output from one or more of the LED chips 1012, and may be in one embodiment formed of a deep-dyed polyester film on a polyethylene terephthalate (PET) substrate.

Continuing to refer to FIG. 10, a printed circuit board (PCB) 1010 may include dedicated circuitry, such as power supply, drive circuit, and controller. The circuitry on the PCB 1010 and equivalents thereof serve as a means for driving the LED chips 1012 (or individual LED dies) to produce the grow light output. As used herein, the term "LED chip(s)" is meant to broadly include LED die(s), with or without packaging and reflectors, that may or may not be treated (for example, and without limitation, with applied phosphors).

A power supply may be used to provide power to a drive circuit which may provide electrical current to the LEDs 1012. A power supply may, for example, convert AC power to DC power for driving the LEDs 1012. A drive circuit may receive power input from power supply, and in turn, the drive circuit may provide an appropriate current supply to drive the LEDs 1012 in accordance with the desired spectral output. In some embodiments, a controller or other tuning mechanism may serve to control the driving of LEDs 1012, and may control light output based on factors such as plant metabolism metrics, time of day, ambient light, real time input, temperature, optical output, and location of the lamp.

Figure 11:
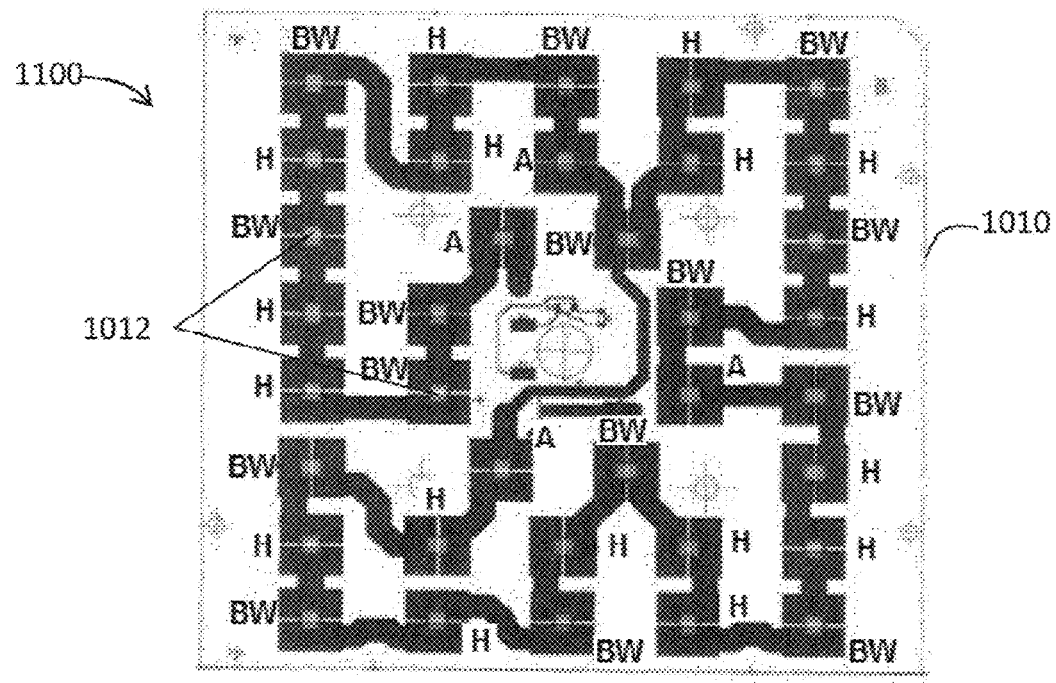
FIG. 11 is a top view of a light source circuit board for a light source of an illumination and grow light system according to an embodiment of the present invention.
Figure 12:
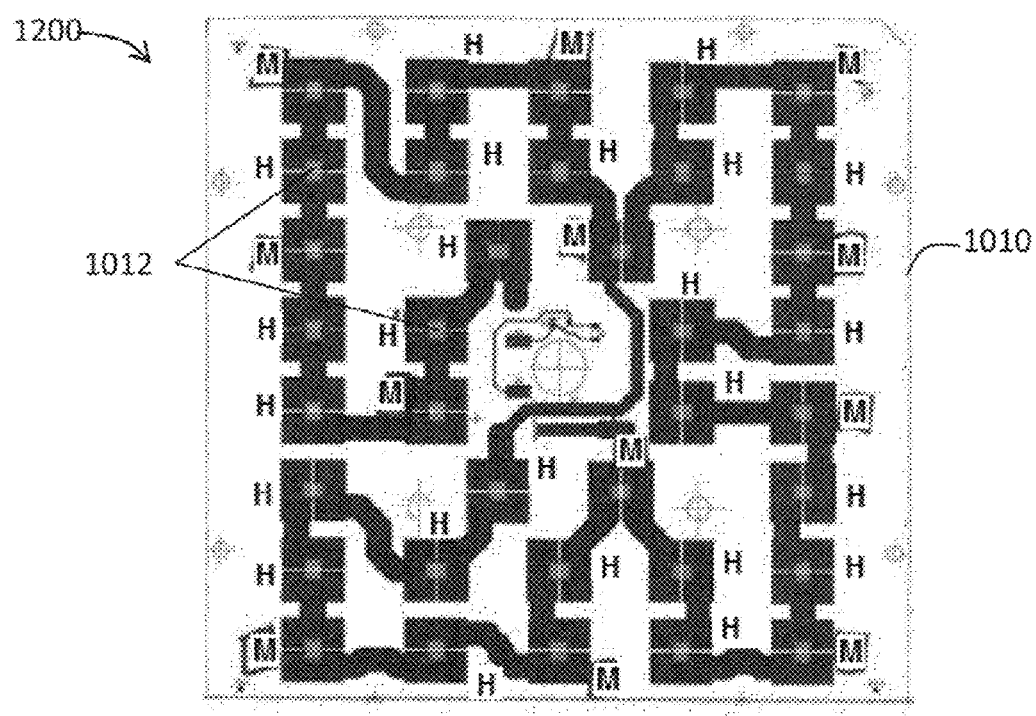
FIG. 12 is a top view of another embodiment of a light source circuit board for a light source of an illumination and grow light system according to an embodiment of the present invention.
Figure 13:
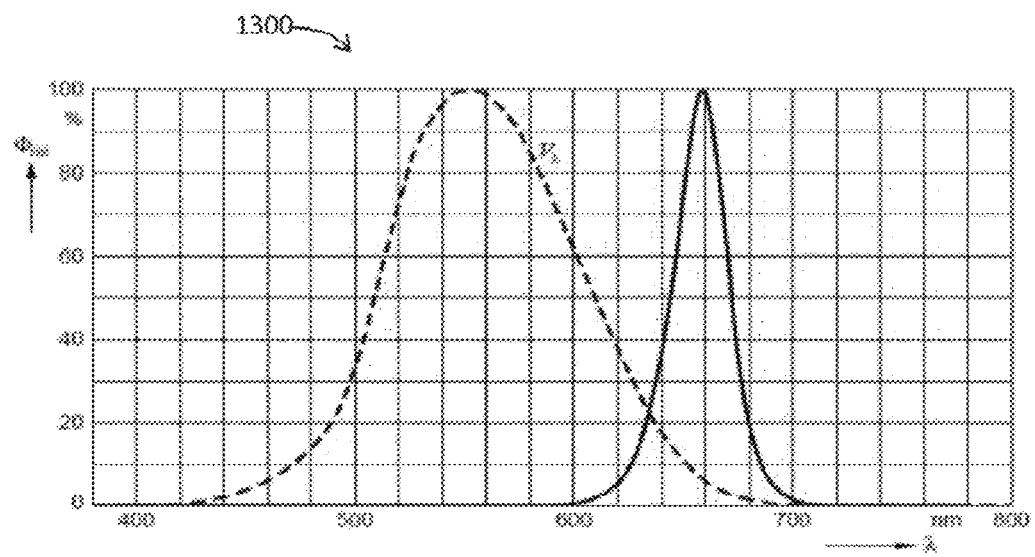
FIG. 13 is a graph of the light emitting spectrum of a Hyper-Red (LH-CPDP) light emitting diode (LED).

Referring now to FIGS. 11 and 12, LED chips 1012 may be mounted onto a circuit board 1010. Although a specific number, type and configuration of LED die or packages are shown, alternative embodiments may include other numbers and combination of LED chips 1012. More specifically, another embodiment may generate greater or lesser amounts of far red, near red, green, blue, and other colors (using the blue-white die) to yield the desired spectrum. To obtain a desired output in terms of color temperatures and/or CRI and/or optimization of PAR, an LED package may employ a specific combination of different color LEDs, and each LED or groups of LEDs may be independently addressed and driven at different currents in order to generate a desired output of light from each specific LED or groups of LEDs. LEDs may be laid out on a board in similar fashion to the examples 1100, 1200 shown in FIGS. 11 and 12 (or differently), but because each LED (or groups of LEDs) may be supplied with power independent of (or at least varying with respect to) the other LEDs or groups, the ability to tune the output to desired emissions characteristics may be achieved.

The schematic board layouts of an LED package 1100, 1200 in accordance with embodiments of the invention, depict functional components which may be mounted on a PCB 1010, or otherwise associated with an LED lamp 900.

Referring now to FIG. 11, an illustration of an LED die layout on the circuit board according to one embodiment of the present invention is provided for example, and without limitation. The example layout in FIG. 11 corresponds to the generated spectrum described above in relation to FIG. 5. In this example, a total of 36 LED chips may be used and placed on the circuit board, the combination of LEDs including 15 "Bluish-white" LEDs, 4 Amber, and 17 Hyper-Red LEDs. The color temperature of the combined light emitted by an LED lamp featuring this PCD layout 1100 may be about 3800 Kelvin and the CRI may be about 74.

Referring now to FIG. 12, an illustration of an LED die layout on the circuit board according to another embodiment of the present invention is provided for example, and without limitation. The example layout in FIG. 12 corresponds to the generated spectrum described above in relation to FIG. 6. In this example, a total of 36 LED chips may be used and placed on the circuit board, the combination of LEDs including 12 "mint" LEDs, and 24 Hyper-Red LEDs. The color temperature of the combined light emitted by an LED lamp featuring this PCD layout 1200 may be about 3000 Kelvin and the CRI may be about 69.

Referring additionally to FIGS. 13-16, the spectra of the LEDs that may be employed in the LED die layouts 1100, 1200 in the above example embodiments of the invention are shown in greater detail. All example LEDs were obtained from OSRAM Opto-Semiconductors. The Hyper-Red LED is an Oslon package (LH-CPDP) that exhibits the spectrum 1300 shown in FIG. 13.

Figure 14:
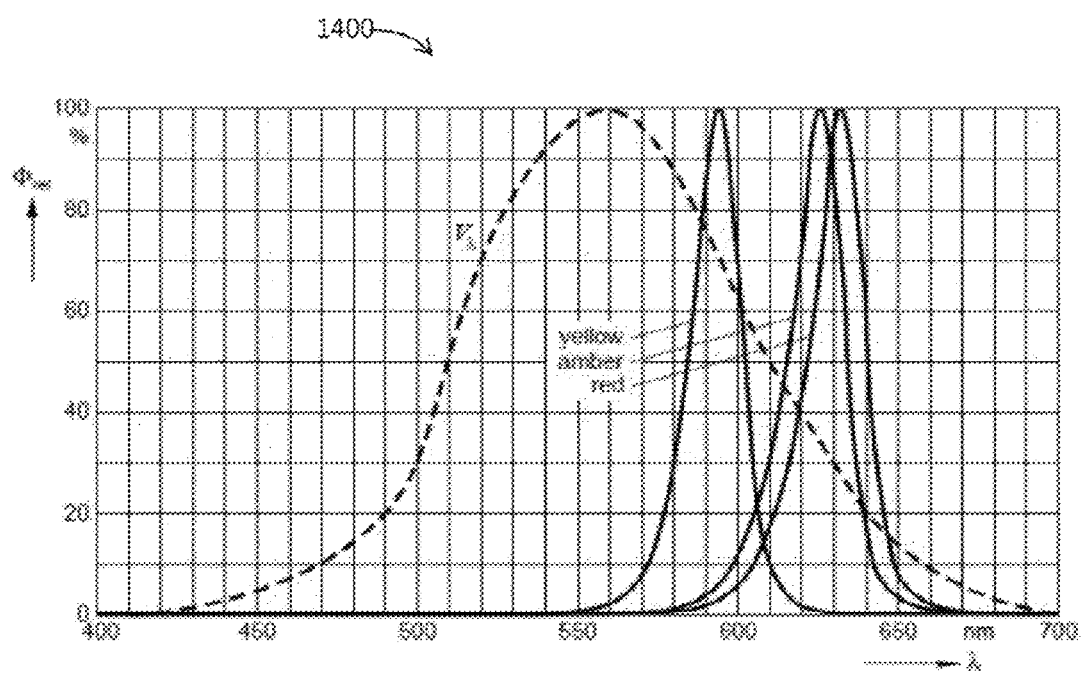
FIG. 14 is a graph of the light emitting spectrum of an Amber (KXKZ-23-Z) light emitting diode (LED).
Figure 15:
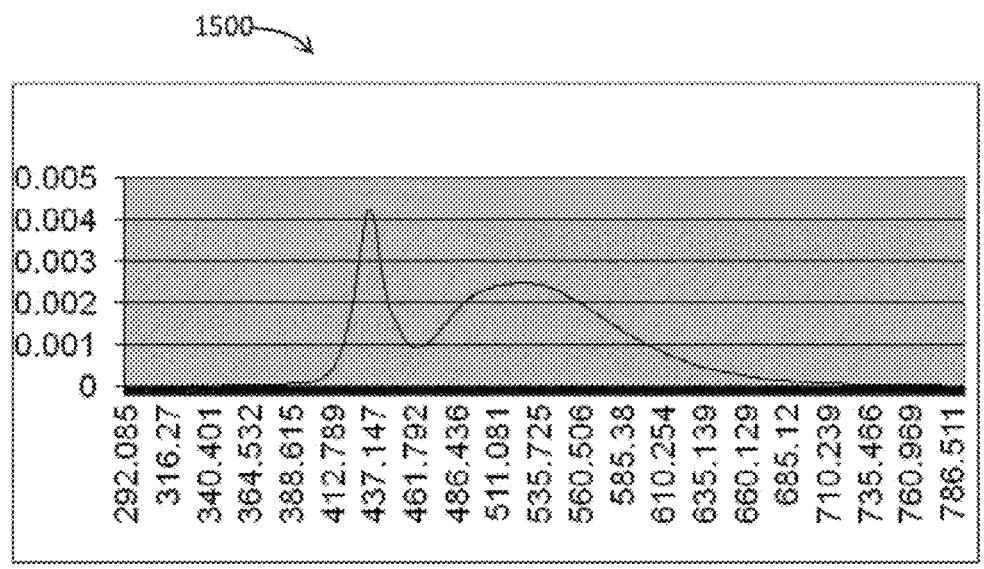
FIG. 15 is a graph of the light emitting spectrum of a Bluish-White (M57301_01) light emitting diode (LED).
Figure 16:
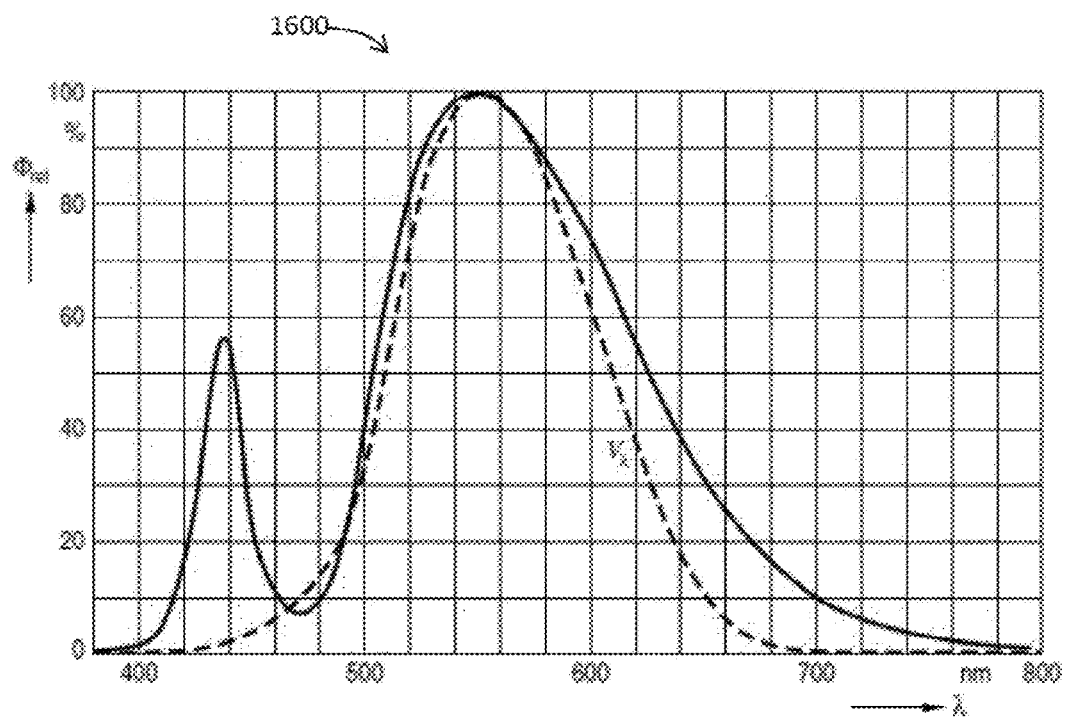
FIG. 16 is a graph of the light emitting spectrum of a Mint light emitting diode (LED).

The amber LED is (KXKZ-23-Z) exhibits the spectrum 1400 as shown in FIG. 14. The bluish-white LED spectrum 1500 is shown in FIG. 15. The LED mint spectrum 1600 is shown in FIG. 16.

In the embodiments described above, all LEDs 1012 are assumed to be driven with substantially the same current. However, a variable currents scheme may also be used, and other arrangements and types of LEDs 1012 may be used to generate emission spectra similar to those shown above and are within the scope of the invention. Furthermore, for a given spectrum, other board configurations, LED package layouts, and LED choices may be employed to achieve the desired properties of an LED lamp.

Mitigating Saturation and Heating

Figure 17:
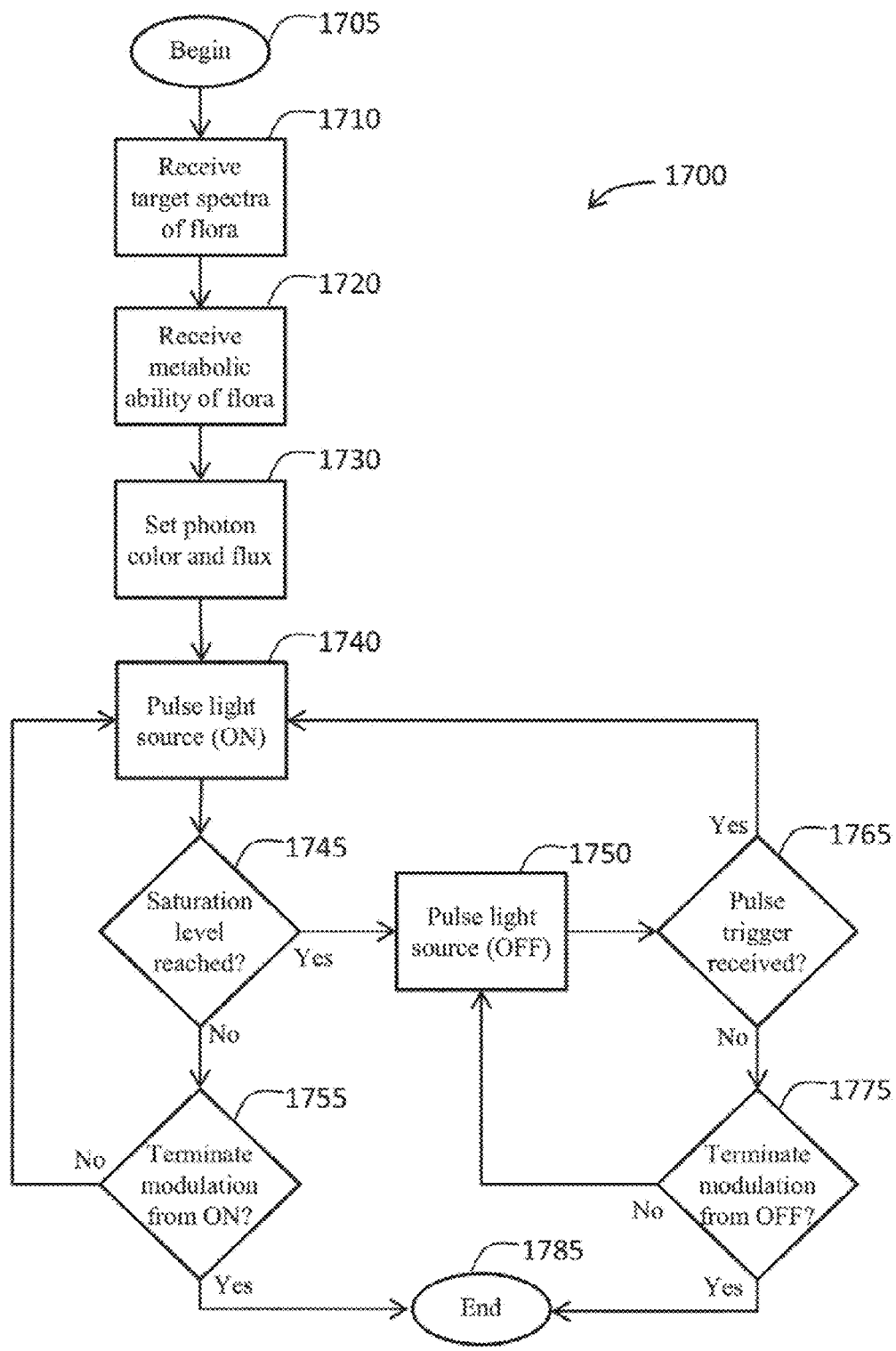
FIG. 17 is a flowchart illustrating a method aspect of an embodiment of the present invention for modulating the emissions of an illumination and grow light system according to an embodiment of the present invention.
Figure 18C:
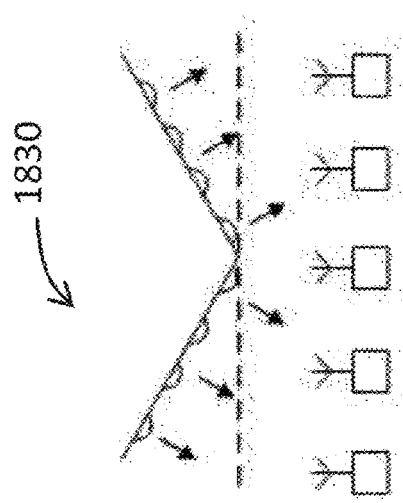
FIGS. 18A, 18B, 18C and 18D are diagrams illustrating alternative embodiments of the illumination of the horticultural growths according to an embodiment of the invention.
Figure 18D:
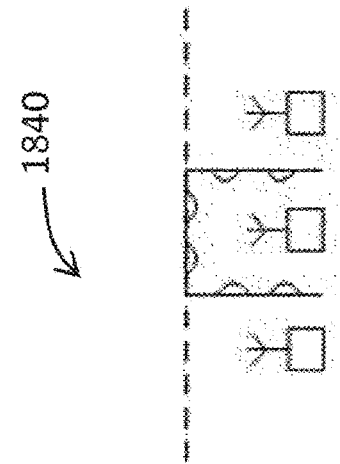
Figure 18A:
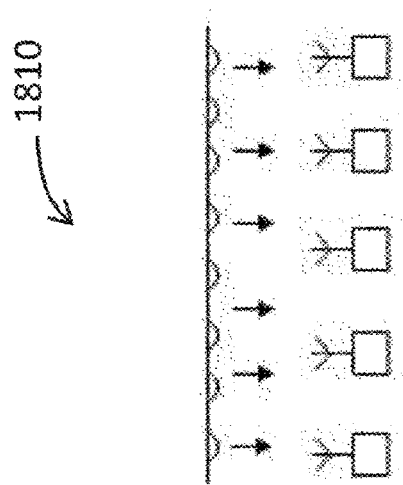
Figure 18B:
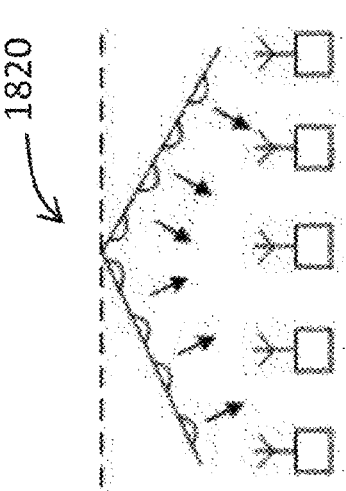

Referring now to flowchart 1700 of FIG. 17, the operation of a method of pulsing the emissions of an illumination and grow light system to mitigate saturation and heating of a plant will be discussed. The following illustrative embodiment is included to provide clarity for one operational method that may be included within the scope of the present invention. A person of skill in the art will appreciate additional operations that may be included in pulsing an illumination and grow light system of the present invention, which are intended to be included herein and without limitation.

From, the start, the operation may begin at Block 1710, where a controller may receive as input the photosynthetic response action spectrum 300 for a given type of flora. At Block 1720, the controller may also receive as input limitations as to the metabolic abilities of the flora. For example, and without limitation, an individual plant, leaf, or cell can only utilize and convert photonic energy to useable plant energy (i.e., photon energy absorbed and used in the electron transport mechanism) at a certain photon flux above a saturation point. Due to this phenomenon of saturation, the plant cells/tissue will be unable to convert the additional photons into useable energy, and these additional photons will instead be absorbed and converted into heat, which may be undesirable if in excess.

Based on the input received regarding the subject flora, the controller may be employed to set the desired light emission characteristics, such as photon color and flux (Block 1730). The controller may then direct some number of light sources to turn on at Block 1730. The controller may monitor signals from some number of sensors, and/or from a user interface, to determine if absorption of the emitted light by the subject plant has reached the plant's saturation level (Block 1745). Until that saturation level is detected at Block 1745, or a signal to terminate the emission of light (Block 1755), the controller may permit the current mode of emission ("on" state) to continue (Block 1740). If, at Block 1745, the controller receives a signal that the saturation level of the subject plant has been reached, the controller may then direct some number of light sources to turn off at Block 1750.

While no light is being emitted from the light sources, the controller may monitor signals from some number of sensors, and/or from a user interface, to determine if absorption of light energy by the subject plant has dropped sufficiently below the plant's saturation level to trigger the application of more tuned light (Block 1765). Until the plant's readiness to absorb more light energy is detected at Block 1765, or a signal to terminate the emission of light is received (Block 1775), the controller may permit the current mode of emission ("off" state) to continue (Block 1775). If, at Block 1765, the controller receives a signal that the subject plant is ready to absorb more light energy, the controller may then direct some number of light sources to turn on at Block 1740.

In the manner described above, the operation will continue to pulse the emission of light between "on" and "off" states in a way that may optimize the absorption of light energy by a subject plant while avoiding harmful heating of the plant and conserving energy in the production of emitted light. If the controller receives a signal to terminate pulsing (Blocks 1755 or 1775), the method may end at Block 1785.

Various approaches to implementing the method described above are contemplated for carrying out the present invention. In one embodiment, a pulse width modulation (PWM) protocol may be employed to address potential overheating issues, and to optimize efficiency. By using PWM per individual color or colors of LEDs, the photon flux may be tuned and optimized to prevent oversaturation and overheating. In one embodiment, the system may be programmed to generate spectra for a specific type of flora. Each type of plant may have different saturation levels. Additionally, plant saturation levels may vary depending on 1) stage of growth, 2) nutrient availability, 3) ambient light levels (time of day), and other factors. The illumination and grow light system of the present invention may be programmed to optimize photon color and flux based on the unique characteristics and limitations of the subject plant.

By pulsing the LEDs in a synchronous or quasi-synchronous manner in relation to a plant's ability to absorb photon energy and use it for photosynthesis (or other plant metabolic activity), not only may heat be minimized but also energy efficiency can greatly be increased. More specifically, pulsing may ensure that photons are not impinging on plant tissue (or impinging less) when the plant cannot use the photon energy metabolically. Applied in the method described above, PWM may achieve not only optimum growth characteristics but also may result in a dramatic reduction in energy use and cost by the users of systems and methods disclosed herein. By coordinating pulses such that the light is off when the leaf or photosynthetic system is saturated, energy may be conserved, efficiency increased, and heating minimized. Other means of pulsing the light or otherwise delivering light or specific wavelengths of light and intensities at specific time intervals to achieve a specific or desired level of photon dosing or PAR dosing may also be employed as will be evident to those skilled in the art.

In another embodiment of implementing the method described above, monitoring the saturation level of a subject plant may be accomplished using sensors. Plants may have fluorescent properties, and the sensing or measuring of the fluorescent output can be used to coordinate the spectrum, intensity, and timing of the grow light. For example, and without limitation, a wide variety of species of *algae* is known to fluoresce upon exposure to visible light. In some cases, the fluorescence spectrum emitted may indicate the status of the plant, such as metabolic activity, health, saturation of light, and time from dark adaptation. By sensing or measuring the fluorescence or attributes thereof (e.g., with a fluorometer, spectrometer, infrared sensor, or other device), information about the state of the flora may be obtained. That information can be used (e.g., programmed into a controller) to drive the emissions of a grow light such that its output is optimized for the given condition of the flora and environment. For example, and without limitation, it is known that in some cases light saturation of the photosynthetic system (PS) may cause a change in the fluorescence of the organism. Thus, in this example, saturation levels of light may be identified or predicted by measuring the fluorescence spectrum in real-time. This information may then be used to drive the grow lamp (or elements thereof), for example, using PWM or PAM/PIM such that over-saturation may be prevented, energy may be conserved, and plant growth may be optimized.

In yet another embodiment of implementing the method described above, pulsing the light source on or off may be accomplished by manually or automatically adjusting individual light sources and/or the entire lighting unit in order to deliver light and/or light intensity within a given solid angle or directed to a certain area of plants. Example embodiments are illustrated in FIGS. 18 *a-d*, the various arrangements of which may allow for controlling the intensity of light and spectrum falling of a given set or plants or plant species. Alternatively or additionally, the adjustment of the combined light emitted from a lighting unit may be managed by a controller which is connected to a sensor (e.g., ambient light sensor, plant growth sensor, $CO_2$ sensor, timer, etc.). Although the examples shown are for a linear fixture, other shapes or combination of shapes that are either fixed or adjustable (via hinges, connectors, etc.) may be used to obtain the desired distribution and are within the scope of the invention.

Embodiments of the present invention are described herein in the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

Figure 19:
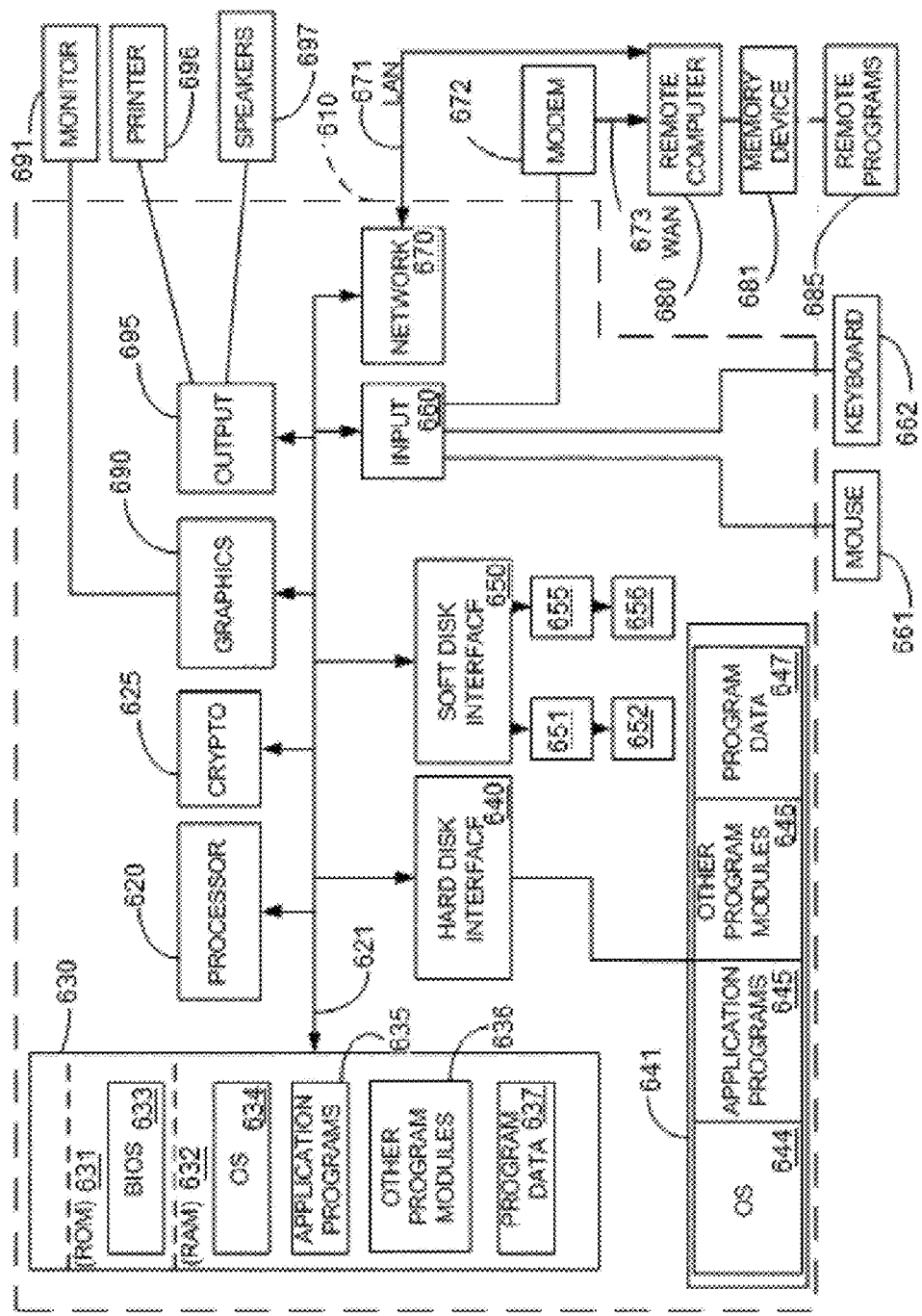
FIG. 19 is a block diagram representation of a machine in the example form of a computer system according to an embodiment of the present invention.

A skilled artisan will note that one or more of the aspects of the present invention may be performed on a computing device, including mobile devices. The skilled artisan will also note that a computing device may be understood to be any device having a processor, memory unit, input, and output. This may include, but is not intended to be limited to, cellular phones, smart phones, tablet personal computers (PCs), laptop computers, desktop computers, personal digital assistants (PDAs), etc. FIG. 19 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (USA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 19 illustrates an operating system (OS) 634, application programs 635, other program modules 636, and program data 637.

The computer 610 may also include other removable/non-removable, volatile/nonvolatile computer storage media. By way of example only, FIG. 19 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 19, provide storage of computer readable instructions, data structures, program modules and other data for the computer 610. In FIG. 19, for example, hard disk drive 641 is illustrated as storing an OS 644, application programs 645, other program modules 646, and program data 647. Note that these components can either be the same as or different from OS 634, application programs 635, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 19. The logical connections depicted in FIG. 19 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 19 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

In accordance with embodiments of the present invention, the components, process steps, and/or data structures may be implemented using various types of operating systems, computing platforms, computer programs, and/or general purpose machines. In addition, after having the benefit of this disclosure, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program, according to an embodiment of the present invention, is a computerized system that requires the performance of one or more steps to be performed on or in association with a computerized device, such as, but not limited to, a server, a computer (i.e., desktop computer, laptop computer, netbook, or any machine having a processor), a dumb terminal that provides an interface with a computer or server, a personal digital assistant, mobile communications device, such as an cell phone, smart phone, or other similar device that provides computer or quasi-computer functionality, a mobile reader, such as an electronic document viewer, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the at least one process step to be carried out in a machine/system/digital environment. It should be noted that the method aspects of the present invention are preferably computer-implemented methods and, more particularly, at least one step is preferably carried out using a computerized device.

Adjusting the Spectral Output Based on the Detected Light

Plants adjust to the canopies in which they grow and as they grow. This may include adjusting in terms of the wavelength range of the light that is incident on them and changes in the spectra in which the canopies absorb. This is also true of individual plant growth. Thus, for a given plant or canopy certain wavelengths of light are absorbed by the plant and other wavelengths are reflected back. By observing which wavelength(s) are reflected back, it can be determined which wavelength ranges a particular plant or canopy does not absorb, or does not fully absorb, at a given intensity. The reflected light can also be used to determine if the plant is saturated with a particular wavelength by which wavelengths are reflected or emitted due to heat energy, phosphorescence, luminescence, or any other light-emitting reaction. Accordingly, light that is "reflected" includes light that is emitted by the plant for the purposes of the invention.

In the following embodiments, reference may be made to a plant, a plant environment, and a canopy. In each instance, these references include any type of plant or number of plants upon which light emitted by a lighting system according to an embodiment of the invention may be incident upon. As such, light emitted from a light source according to an embodiment of the invention may be incident upon one or more plants, and light that is reflected and/or emitted and sensed by the embodiment of the invention may be from one or more plants.

An exemplary embodiment of the invention may detect the wavelengths of light reflected by a particular plant or canopy on which light is emitted. By determining which wavelengths of light are reflected, the lighting system can be adjusted so as to not emit, or emit a lower intensity of, wavelengths which the particular plant environment is not absorbing and/or absorbing and emitting at a converted wavelength.

Figure 20:
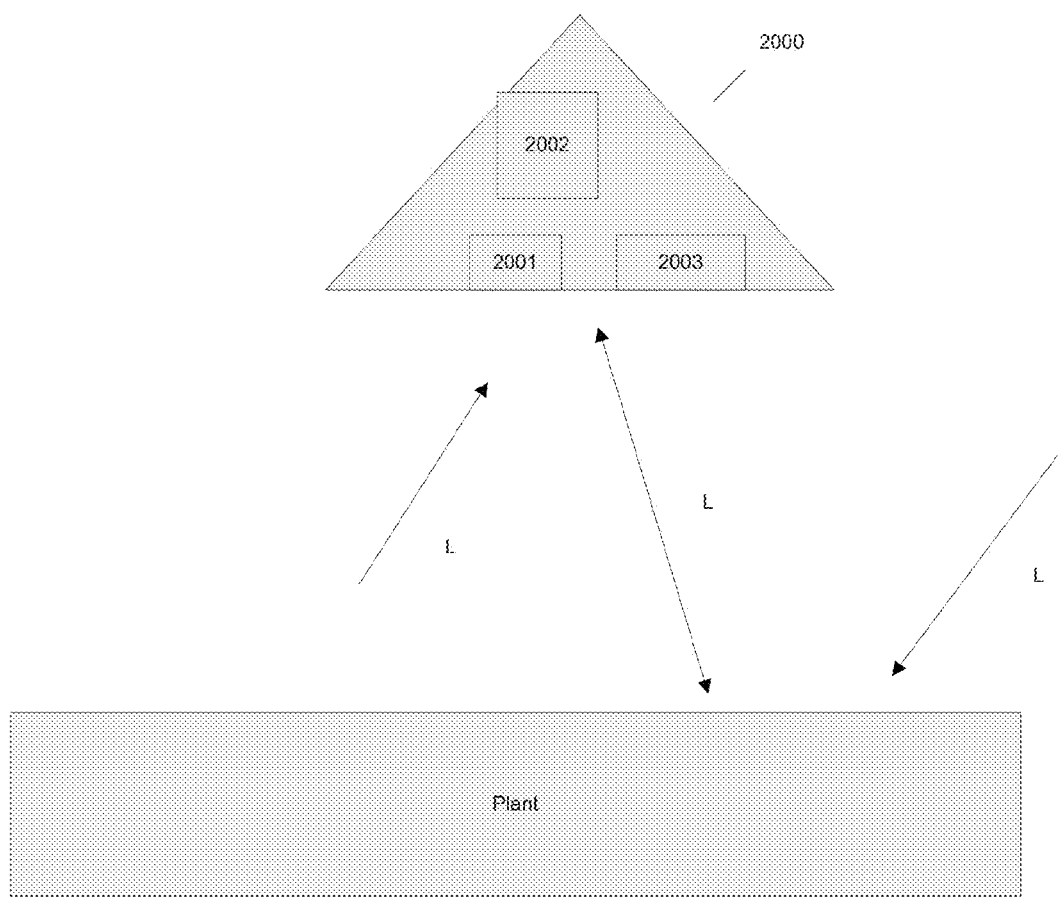
FIG. 20 is an illustration of an illumination and grow light according to an embodiment of the invention.

In an exemplary embodiment, as illustrated in FIG. 20, a lighting system 2000 can include a light source 2001, including one or more light emitting sources, a controller 2002 positioned in electrical communication with the light source 2001 and configured so as to operate the light source 2001 in order to control the light spectrum, intensity, and/or direction of the combined light (or portions thereof) that is emitted, and a sensor 2003 which is positioned in electrical communication with the controller and configured to detect one or more wavelengths of light reflected and/or emitted from the plant.

The light source 2001 may include a plurality of light sources 2001 which may have the same or different spectral outputs. Furthermore, each light source 2001 of the plurality of light sources 2001 may emit light defined as a source light. In some embodiments, the light source 2001 may include an optic 2005 which can be in optical communication with one or more of the light sources 2001. For instance, the optic 2005 can be used to combine the source light emitted by the plurality of light sources 2001 into a combined light. Additionally, in some embodiments, the optic 2005 may adjust one or more characteristics of the source lights or the combined light. The optic 2005 may also be used to diffuse, concentrate, change the color or light spectrum, filter, or otherwise alter the source light from light sources 2001 individually or collectively. The optic 2005 may also be used as a light guide to direct the source light.

The controller 2002 may be configured to operate the plurality of light sources 2001 individually, or as groups, or as a single group. If the light sources 2001 are operated by groups, then the light sources 2001 may be grouped by spectral output, direction, location, a particular pattern (e.g., every other red LED is group 1), etc.

The detecting of reflected light may be done by the sensor 2003. The sensor 2003 may include a plurality of sensors for detecting light from different directions or regions. In addition, the senor 2003 may include a plurality of sensors 2003 which can detect different wavelength ranges. This plurality of sensors 2003 may allow the detection of a broad spectrum of light by specific region and wavelength. With this information, the controller 2002 can adjust the wavelength and intensity of light emitted so as to save power, reduce light pollution, reduce heat applied both to the plant and the lighting system, extend the life of the light source, etc.

Figure 21:
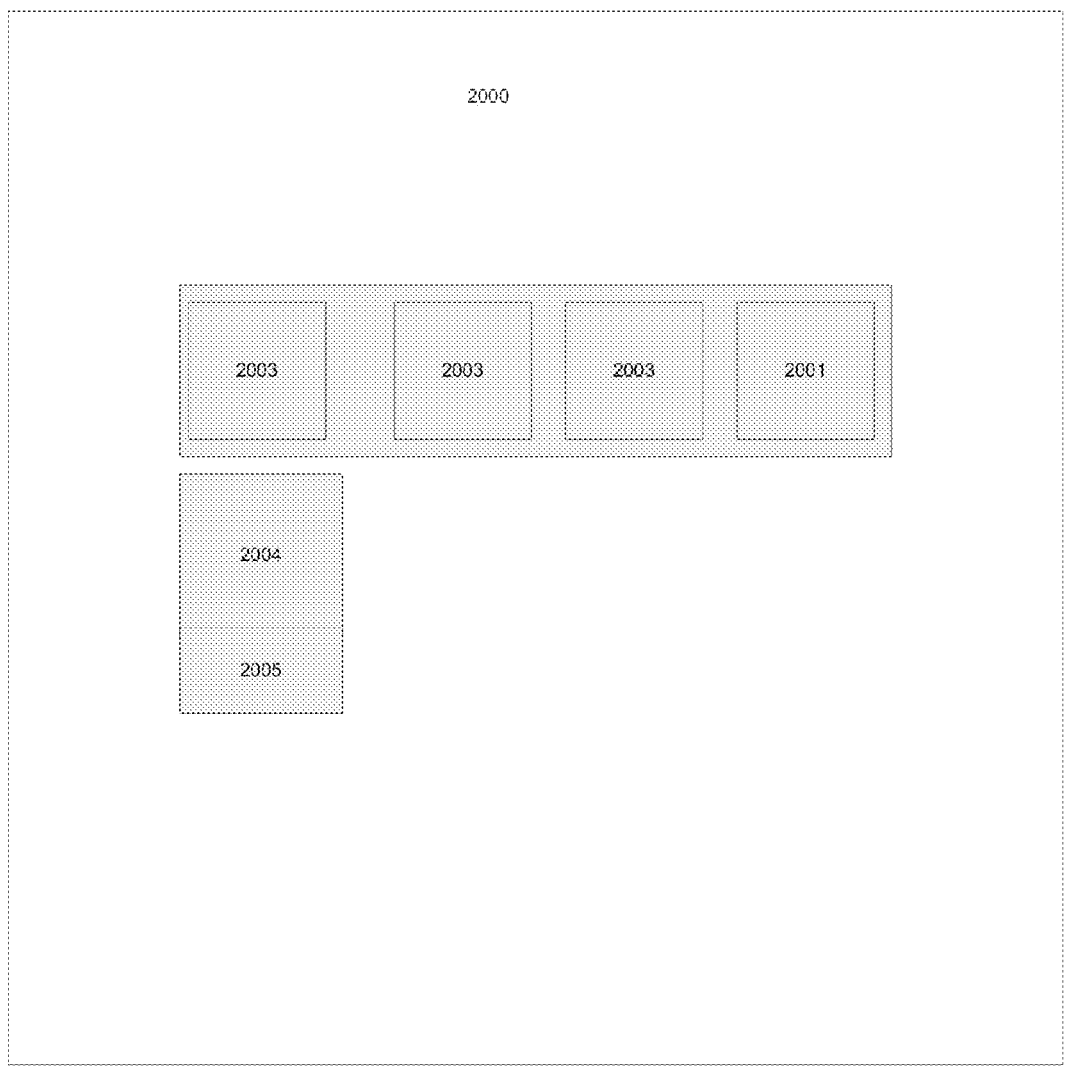
FIG. 21 is a block diagram of an illumination and grow light according to an embodiment of lighting system 2000.

As illustrated in FIG. 21, an exemplary embodiment of the sensor 2003 may include one or more of the sensor 2003 which may be arranged to detect different wavelengths, face in different directions, etc. The sensor 2003 may also be used in conjunction with the optic 2005 to shift the spectrum of light transmitted to the sensor 2003 (e.g., a color altering phosphor), act as a light guide or other directional component in order to detect light from discrete directions, and other purposes to further alter the light prior to entering the sensor 2003.

The sensor 2003 may be any appropriate electromagnetic detection device and may include any of a charge-coupled device (CCD) color sensor, a photomultiplier tube, a photodiode, an avalanche photodiode (APD), etc. In some embodiments sensor 2003 can include a light emitting diode of the light source 2001 adapted to selectively operate between a sensing operation and an emitting operation. Additional details regarding the operation of an LED in sensing and emitting operations may be found in U.S. Pat. No. 8,492,995, the content of which is incorporated by reference herein in its entirety except to the extent disclosure therein is inconsistent with disclosure herein.

The detection of the wavelength reflected may be done continuously or periodically. If periodic detection with the sensor 2003 is utilized, the light source 2001 can emit the current spectrum and the sensor 2003 can detect the reflected light thereof and make adjustments to optimize the emitted spectrum. In addition, the light source 2001 may emit the full spectrum of light which the lighting source can emit (or more of a full spectrum than the currently tuned spectrum) in order to recalibrate the system. By using a full spectrum emission, or just additional wavelengths and/or greater intensity, if previously removed or reduced wavelengths can now be absorbed by the plant, either due to changes in the plant composition, organization or structure, atmospheric changes or environmental factors, plant saturation, etc., then those wavelengths may be applied if the detected reflected light so warrants. Depending on the environment and desired tuning, the recalibration may occur less frequently than a simple adjustment using the currently emitted spectrum. The period for such recalibration may be any length of time, such as, for instance and not by limitation, within the range from every 100 milliseconds to once per week.

For instance, the sensor 2003 may be used to determine a baseline reflectance. The baseline reflectance may be set at any period, such as before plant growth, at user request, periodically, when the light sources 2001 are active, while the light sources 2001 are not active, etc. The controller 2002 can then be used to operate the plurality of light sources 2001 in a manner that is responsive to deviations of the reflected light from the baseline as measured by the sensor 2003. The controller 2002 may associate the detected wavelengths with one or more of the light sources 2001 and adjust the operation of one or more of the light sources 2001 accordingly. Similarly, the controller 2002 may determine that the wavelength range is not associated with a wavelength range of the light sources 2001 and adjust the operation of the light sources 2001 accordingly based at least partially on the detected wavelengths which are not associated with light sources 2001. In some embodiments, the controller 2002 may associate a reflected converted light with the light source 2001 whose light was converted. The controller 2002 may then adjust the operation of the light source 2001 based on the converted light of the light source 2001. It is also possible for the baseline reflectance to be set or adjusted manually.

If a single sensor 2003 type is used to detect multiple wavelength groups, a filter 2004 may be used with the sensor 2003 to filter out different wavelengths. The filter 2004 may be mechanically moved or electrically altered so that different filter characteristics are applied to the light entering the sensor 2003. For instance, the sensor 2003 may be able to detect one or more wavelength ranges of the reflected light. By using monochromatic filters 2004, or other wavelength limiting filters, the reflected light can be selectively filtered. The sensor 2003, and/or the filter 2004 can be moved to change the wavelength range which the sensor 2003 is exposed to. This can allow sensor 2003 to detect different reflected wavelength ranges at discrete periods of time so as to register the intensity of each wavelength range individually.

For example, filter 2004 and/or optic 2005 may include an optical divider where the optical divider is configured to divide the reflected light into a plurality of monochromatic wavelength ranges and the optical sensor 2003 is configured to receive the plurality of monochromatic wavelength ranges. In some embodiments, the optical sensor system may be configured to cycle through the plurality of monochromatic filters 2004 where each of the monochromatic filters 2004 is configured to receive the reflected light and permit light within a wavelength range to pass therethrough, defined as a filtered light; and where the optical sensor 2004 is configured to receive the filtered light from each of the monochromatic filters.

While the filter 2004 is illustrated as being disposed between the sensor 2003 and the optic 2005, the location of the optic 2005 and the filter 2004 may switched.

In some embodiments, the sensor 2003 may include sensors which are dedicated to detect selected wavelength ranges (e.g., red light sensor, blue light sensor, etc.). Thus, the sensor 2003 can be configured to detect the specific wavelength ranges absorbed by the plant and/or can be set to detect wavelength ranges emitted by the light source. For instance, the sensor 2003 may detect any or all of the wavelength ranges of 650 to 700 nm, 580 to 680 nm, less than 500 nm, a portion of the plant absorption range, a range(s) emitted by one or more of the light sources 2001, or other desired ranges.

In some embodiments, the sensor 2003 is configured to detect chlorophyll fluorescence. For example, the sensor 2003 may be configured to detect the wavelengths emitted by chlorophyll molecules, such as when the chlorophyll molecules have been excited by incident light. The controller 2002 may also be configured to distinguish between wavelengths emitted from heat energy dissipation from the plant, and the wavelengths genereated by the cholorophyll molecules. This may be used to determine the efficiency of the photochemistry of the plant(s). Other types of fluorescence that may result from the plant are contemplated and included within the scope of the invention.

It is also possible, for sensor 2003 to detect emitted gasses (e.g., CO2), to further determine photochemistry efficiency. Some embodiments may also have sensor 2003 configured so as to perform laser-induced fluorescence to further determine plant chemistry and efficiency.

With reference to the spectra of light emitted by a lighting device according to the present invention as illustrated in FIGS. 5 and 6 and having characteristics shown in FIG. 7, it is contemplated that the above- and below-described measurement of light reflected by a plant, and adjustment of light emitted by a lighting device responsive to the measured reflected light, may cause light emitted by the lighting device to deviate from the spectra of FIGS. 5 and 6, and may result in characteristics that deviate from those shown in FIG. 7 and described in the attending description. Such deviation is not inconsistent with the distinctive features of the various embodiments of the invention, as moderate variation of the spectra and characteristics maintains the utility of the recited embodiments, and retains the advantages over the prior art.

The method of adjusting the light spectrum is not particularly limited. For instance, adjustments of wavelength and intensity can be done through filters, increasing or decreasing of supplied power to the light source, etc. For example, if the light source 2001 is formed of light emitting diodes (LEDs), the intensity of the light emitted for a particular wavelength can be changed through the use of pulse width modulation. Another option is the use of a polarizing filter. In order to change the wavelengths emitted toward the plant, the light source 2001 may have LEDs which emit a particular wavelength turned off or on, or the intensity of those LEDs can be changed.

In some embodiments, the direction of the reflected light is determined through the use of multiple directed sensors 2003 (e.g., one sensor faces towards one region/direction and another sensor faces toward another region/direction). By directionally determining light reflectance, the emitted light profile may be further optimized. For instance, if a large amount of one wavelength of light is being reflected from a particular region/direction relative to other regions/directions, then the light source 2001 can turn off or decrease the intensity of the light sources emitting that wavelength in that particular direction.

By reducing the light emitted which is reflected back (e.g., not being absorbed by the plant), power consumption, heat generation, longevity and other characteristics of the lighting system and plant can be improved.

Adjusting for excess reflected light within a certain wavelength range may also be done by reducing the intensity for a particular wavelength, or increasing the intensity if adequate light is not reflected in that wavelength. This may be accomplished through the use of pulse width modulation for specific LEDs or by deactivating or activating a certain number/percentage of the LEDs which produce the wavelength to be adjusted. In addition, other adjustment processes may be used such as filtering a portion of a particular wavelength or converting a portion of a particular wavelength to another wavelength, such as converting green light to red light through the use of phosphors.

The method of adjusting the intensity of the wavelengths of light emitted, or the overall spectrum emitted, is not particularly limited. In some exemplary embodiments, the amount of reflected light detected for a particular wavelength range can be detected. If a certain amount of the wavelength range (e.g., a certain intensity) is not detected the output of that range can be incrementally increased. Once a certain amount is detected, the adjustment of the wavelength is completed. As an alternative, once a certain amount of the wavelength is detected, the amount can be reduced until it is no longer detected or until the detected wavelength is below a certain intensity. This can allow the lighting system 2000 to ensure that the plant is receiving the desired wavelength, and then reduce power until a low amount or none is reflected (i.e., the light of that wavelength is being absorbed) to save energy, reduce heat, etc.

In addition, the sensor 2003 can be used to detect the reflected light, and/or the light incident on the plant, while the light source 2001 is not active. This may be useful in determining the light spectrum profile which the plant is naturally receiving during a certain time period. Using this information, the controller 2002 can adjust the light emitted from the light source 2001 to further improve plant health. For instance, if the particular plant only needs a certain number of hours of a particular light spectrum a day, then the light source 2001 may not be required to run continuously or may need to emit light in a certain wavelength to compensate for the ambient light received by the plant.

The controller 2002 may be located locally with the light source 2001 or may be located remotely in communication with the sensor 2003 and the light source 2001, depending on the needs of the particular application. For instance, in some embodiments an array of light sources 2001 and the sensor 2003 distributed over a large growing area can be controlled and coordinated by one or more controllers through wired or wireless communication techniques. This may allow coordinated use of light sources to manage heat, light pollution, power needs, etc.

In some embodiments, the lighting system includes the controller 2002, the light source 2001 and the sensor 2003 locally, in the same structure, or even on the same chip/circuit board. This may allow the lighting system 2000 to operate autonomously. This is especially useful if it is desired to simplify the infrastructure requirements for a large area or if the lighting systems are used individually or in a geographically dispersed manner where joint control is not practical.

As described above, the adjustment of the light spectrum in response to the detected light spectrum can be done so as to take into account the desired color temperature and/or color rendering index.

In some embodiments, the light history of the plant may be inferred based on the reflectance or other emitted radiation (e.g., thermal, fluorescence, phosphorescence) detected by sensor 2003. This data may be used to adjust the real time radiation on the plants.

Figure 22:
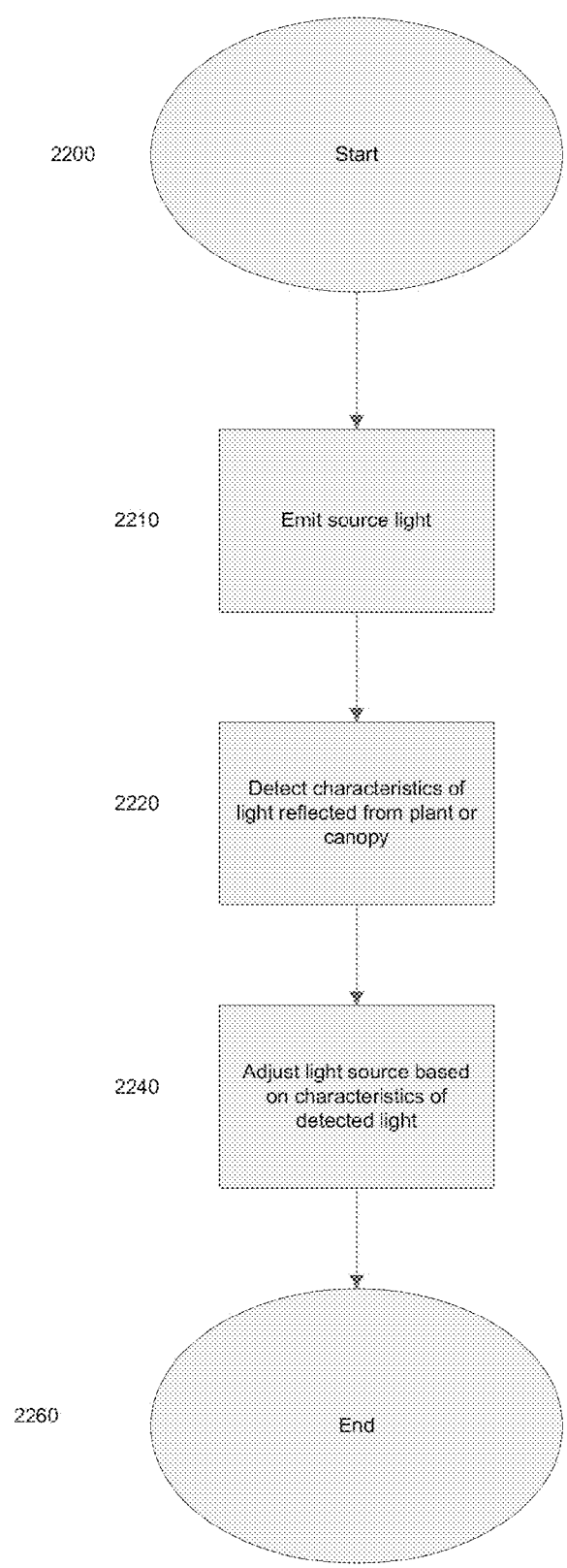
FIG. 22 is a flow chart illustrating a method of light detection and adjustment according to an embodiment of the invention.

FIG. 22 illustrates an exemplary method of adjusting the spectrum output of a lighting device in relation to detected light. The method starts at block 2200. At block 2220, a sensor may detect a wavelength range of reflected light. The controller may adjust the light output spectrum based at least partially on the detected wavelength range of the sensor at block 2240. The method ends at block 2260.

Figure 23:
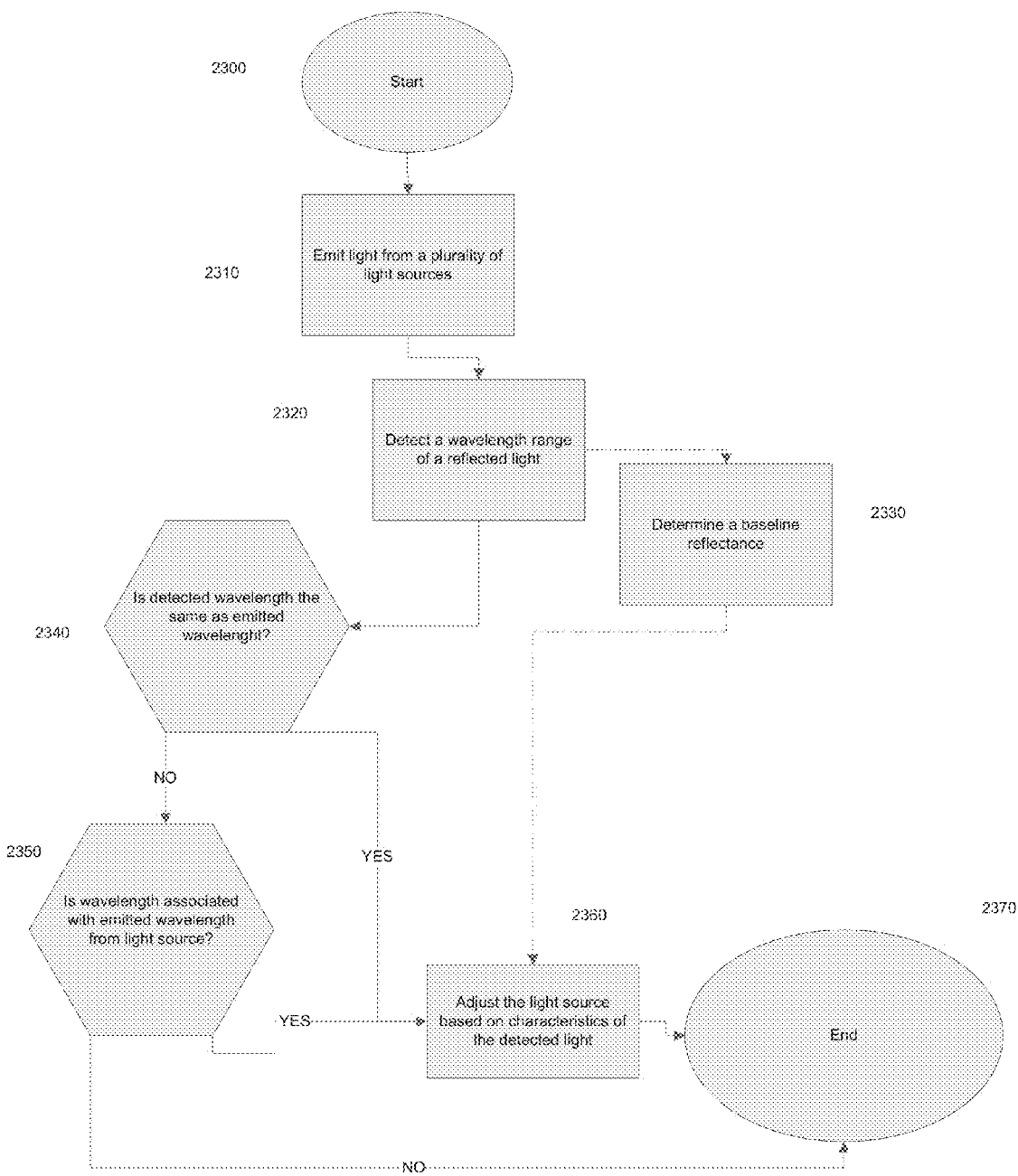
FIG. 23 is a flow chart illustrating another method of light detection and adjustment according to an embodiment of the invention.

FIG. 23 illustrates another exemplary method of adjusting the a lighting device in relationship to detected light. The method starts at block 2300. At block 2310, light may be emitted from at least one of the plurality of light sources. A sensor may detect a wavelength range of light reflected from an object at block 2320. Optionally, a baseline reflectance may be determined at block 2330. At block 2340 it may be determined if the detected wavelength is the same as a wavelength emitted by the light source. If yes, then the operation of the light source can be adjusted responsive to the detected light at block 2360 and the process may end at block 2370. The nature of the adjustment may be in accordance with such an adjustment as described hereinabove. If no, then at block 2350 it may be determined if the detected wavelength is associated with a light emitted by light source (e.g., light which has undergone wavelength conversion). If the wavelength detected is associated with the light emitted by light source, then the operation of the light source may be adjusted at block 2360, as described hereinabove, otherwise the process may end at block 2370.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A lighting system with adjustable wavelength output comprising:
   a plurality of light sources;
   a controller positioned in electrical communication with the plurality of light sources; and
   an optical sensor system positioned in electrical communication with the controller;
   wherein the controller is configured to selectively operate each light source of the plurality of light sources to emit one or more source lights;
   wherein the optical sensor system is configured to sense a reflected light that is reflected by an object upon which the source lights are incident;
   wherein the optical sensor system is configured to sense a wavelength range of the reflected light defined as a measured wavelength range;
   wherein the optical sensor system is configured to transmit a signal to the controller responsive to the measured wavelength range;
   wherein the controller is configured to operate the plurality of light sources responsive to the signal received from the optical sensor system;
   wherein the plurality of light sources comprises a plurality of light emitting diodes (LEDs); and
   wherein at least one LED of the plurality of LEDs is configured to selectively operate between a sensing operation and an emitting operation, the sensing operation being defined by the at least one LED being configured to operate as the optical sensor system, and the emitting operation being defined by the at least one LED being configured to operate as a light source of the plurality of light sources.

2. The lighting system according to claim 1 further comprising an optic configured to combine the one or more source lights to be defined as a combined light.

3. The lighting system according to claim 2 wherein at east one of the optic and a light source of plurality of light sources comprises a color conversion layer; wherein the color conversion layer is configured to receive a source light within a source light wavelength range and emit a converted light within a converted light wavelength range.

4. The lighting system according to claim 1 wherein the reflected light sensed by the optical sensor system is associated with the one or more source lights; and wherein the controller is configured to reduce emission of the one or more source lights associated with the reflected light sensed by the optical sensor system.

5. The lighting system according to claim 1 wherein the measured wavelength range comprises at least one of 410-490 nm and 590-650 nm.

6. The lighting system according to claim 1 wherein the optical sensor system comprises an optical divider and an optical sensor; wherein the optical divider is configured to divide the reflected light into a plurality of monochromatic wavelength ranges; and wherein the optical sensor is configured to receive the plurality of monochromatic wavelength ranges.

7. The lighting system according to claim 1 wherein the optical sensor system comprises a plurality of monochromatic filters and an optical sensor; wherein the optical sensor system is configured to cycle through the plurality of monochromatic filters; wherein each of the monochromatic filters is configured to receive the reflected light and permit light within a wavelength range to pass therethrough, defined as a filtered light; and wherein the optical sensor is configured to receive the filtered light from each of the monochromatic filters.

8. The lighting system according to claim 1 wherein the optical sensor system comprises at least one of a charge-coupled device (CCD) color sensor, a photomultiplier tube, a photodiode, and an avalanche photodiode (APD).

9. The lighting system according to claim 1 wherein the source light emitted by each light source of the plurality of light sources comprises a power intensity; and wherein the controller is further configured to selectively operate each light source of the plurality of light sources to emit a source light having differing power intensities.

10. The lighting system according to claim 1 wherein the optical sensor system is configured to determine a baseline reflectance; and wherein the controller is configured to selectively operate the plurality of light sources responsive to deviations of the reflected light that is sensed by the optical sensor system from the baseline reflectance.

11. The lighting system according to claim 1 wherein the one or more source lights each comprise a source light wavelength range; wherein the controller is configured to identify a measured wavelength range that does not correspond to the source light wavelength range of the one or more source lights; wherein the controller is configured to associate the measured wavelength range with at least one light source of the plurality of light sources; and wherein the controller is configured to operate the plurality of light sources responsive to an indication of a reflected light comprising a wavelength range not associated with the wavelength range of the one or more source lights.

12. The lighting system according to claim 11 wherein the controller is configured to identify a source light of the one or more source lights that has undergone a wavelength conversion to a wavelength range defined as a converted wavelength range based on the light reflected from the object upon which the source light of the one or more source lights was incident defined as a converted reflected light; and wherein the controller is configured to associate the light source that emits the source light resulting in the reflected light comprising the converted wavelength range with the converted reflected light.

13. A lighting system with adjustable wavelength output comprising:
   a plurality of light emitting diodes (LEDs);
   a controller positioned in electrical communication with the plurality of LEDs and configured to selectively operate each LED of the plurality of LEDs to emit one or more source lights;
   an optical sensor system positioned in electrical communication with the controller; and
   an optic configured to combine the one or more source lights to be defined as a combined light;
   wherein the optical sensor system is configured to sense a reflected light that is reflected by an object upon which the source lights are incident;
   wherein the optical sensor system is configured to sense a wavelength range of the reflected light defined as a measured wavelength range;
   wherein the optical sensor system is configured to transmit a signal to the controller responsive to the measured wavelength range;

wherein the controller is configured to operate the plurality of LEDs responsive to the signal received from the optical sensor system;

wherein the reflected light sensed by the optical sensor system is associated with the one or more source lights;

wherein the controller is configured to reduce emission of the one or more source lights associated with the reflected light sensed by the optical sensor system;

wherein at least one LED of the plurality of LEDs is configured to selectively operate between a sensing operation and an emitting operation, the sensing operation being defined by the at least one LED being configured to operate as the optical sensor system, and the emitting operation being defined by the at least one LED being configured to operate as a light source of the plurality of LEDs;

wherein the one or more source lights each comprise a source light wavelength range;

wherein the controller is configured to identify a measured wavelength range that does not correspond to the source light wavelength range of the one or more source lights;

wherein the controller is configured to associate the measured wavelength range with at least one LED of the plurality of LEDs; and wherein the controller is configured to operate the plurality of LEDs responsive to an indication of a reflected light comprising a wavelength range not associated with the wavelength range of the one or more source lights.

14. The lighting system according to claim 13 wherein the optical sensor system comprises an optical divider and an optical sensor; wherein the optical divider is configured to divide the reflected light into a plurality of monochromatic wavelength ranges; and wherein the optical sensor is configured to receive the plurality of monochromatic wavelength ranges.

15. The lighting system according to claim 13 wherein the optical sensor system comprises a plurality of monochromatic filters and an optical sensor; wherein the optical sensor system is configured to cycle through the plurality of monochromatic filters; wherein each of the monochromatic filters is configured to receive the reflected light and permit light within a wavelength range to pass therethrough, defined as a filtered light; and wherein the optical sensor is configured to receive the filtered light from each of the monochromatic filters.

16. The lighting system according to claim 13 wherein the controller is configured to identify a source light of the one or more source lights that has undergone a wavelength conversion to a wavelength range defined as a converted wavelength range based on the light reflected from the object upon which the source light of the one or more source lights was incident defined as a converted reflected light; and wherein the controller is configured to associate the LED that emits the source light resulting in the reflected light comprising the converted wavelength range with the converted reflected light.

17. A method of operating a lighting system comprising a plurality of light sources, a controller in electrical communication with the plurality of light sources, and an optical sensor in electrical communication with the controller, the method comprising:

selectively operating each light of the plurality of light sources to emit a source light;

sensing a reflected light that is reflected by an object upon which the source light is incident;

sensing a wavelength range of the reflected light defined as a measured wavelength range;

transmitting a signal to the controller responsive to the measured wavelength range;

operating the plurality of light sources responsive to the signal received from the optical sensor system;

identifying a measured wavelength range that does not correspond to the source light wavelength range of the one or more source lights;

associating the measured wavelength range with at least one light source of the plurality of light sources; and operating the plurality of light sources responsive to an indication of a reflected light comprising a wavelength range not associated with the wavelength range of the one or more source lights.

18. The method according to claim 17 further comprising combining the one or more source lights to be defined as a combined light.

19. The method according to claim 17 wherein the reflected light sensed by the optical sensor system is associated with the one or more source lights; and further comprising reducing emission of the one or more source lights associated with the reflected light sensed by the optical sensor system.

20. The method according to claim 17 further comprising determining a baseline reflectance and selectively operating the plurality of light sources responsive to deviations of the reflected light from the baseline reflectance.

21. The method according to claim 17 further comprising:

identifying a source light of the one or more source lights that has undergone a wavelength conversion to a wavelength range defined as a converted wavelength range based on the light reflected from the object upon which the source light of the one or more source lights was incident defined as a converted reflected light; and associating the light source that emits the source light resulting in the reflected light comprising the converted wavelength range with the converted reflected light.

* * * * *